United States Patent
Sotani et al.

(10) Patent No.: US 9,631,697 B2
(45) Date of Patent: Apr. 25, 2017

(54) BALANCER APPARATUS FOR INTERNAL COMBUSTION ENGINE

(71) Applicant: HONDA MOTOR CO., LTD., Tokyo (JP)

(72) Inventors: Hiroshi Sotani, Wako (JP); Takahiro Imafuku, Wako (JP); Toru Kisaichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 14/830,111

(22) Filed: Aug. 19, 2015

(65) Prior Publication Data
US 2016/0091049 A1   Mar. 31, 2016

(30) Foreign Application Priority Data
Sep. 29, 2014  (JP) .................... 2014-198127

(51) Int. Cl.
*F16F 15/32*   (2006.01)
*F16F 15/26*   (2006.01)

(52) U.S. Cl.
CPC .................. *F16F 15/264* (2013.01)

(58) Field of Classification Search
CPC ... F16F 15/264; F16F 15/267; F16H 57/0025; F16H 57/0018
USPC ....................................................... 123/192.2
See application file for complete search history.

(56) References Cited

U.S. PATENT DOCUMENTS 4,617,885 A * 10/1986 Oshiro .................... F02B 61/02
                                                      123/192.2

FOREIGN PATENT DOCUMENTS

JP        07-018051 U    3/1995
JP        2010-236499 A  10/2010

* cited by examiner

*Primary Examiner* — Hung Q Nguyen
(74) *Attorney, Agent, or Firm* — Birch, Stewart, Kolasch & Birch, LLP

(57) ABSTRACT

A gear transmission mechanism is provided between a crankshaft and the balancer shaft. The balancer shaft includes a pair of bearing portions supported for rotation on a crankcase and a gear wheel supporting portion formed in a tapering shape such that a diameter thereof decreases away from one bearing portion. A tubular boss portion is provided integrally on the driven gear wheel and has a tapering attachment hole in which the gear wheel supporting portion is fitted. A fitting recessed portion in which a pin which has an axial line along a radial direction of the balancer shaft and is fitted at a half portion on one end side thereof in a large diameter end portion of the gear wheel supporting portion is fitted at a half portion on the other end side thereof is provided on the boss portion on the large diameter end side of the attachment hole.

20 Claims, 20 Drawing Sheets

BALANCER APPARATUS FOR INTERNAL COMBUSTION ENGINE

CROSS-REFERENCE TO RELATED APPLICATIONS

The present application claims priority under 35 USC 119 to Japanese Patent Application No. 2014-198127 filed Sep. 29, 2014 the entire contents of which are hereby incorporated by reference.

BACKGROUND OF THE INVENTION

Field of the Invention

The present invention relates to a balancer apparatus for an internal combustion engine wherein, between a crankshaft supported for rotation on a crankcase which configures part of an engine main body and a balancer shaft having a balance weight and supported for rotation on the crankcase so as to have an axial line parallel to the crankshaft, a gear transmission mechanism is provided that includes a driven gear wheel fixed to the balancer shaft.

Description of Background Art

A balancer apparatus for an internal combustion engine is known. See, for example, Japanese Utility Model Laid-Open No. Hei 7-18051 and Japanese Patent Laid-Open No. 2010-236499.

In the balancer apparatus for an internal combustion engine disclosed in Japanese Utility Model Laid-Open No. Hei 7-18051 and Japanese Patent Laid-Open No. 2010-236499 mentioned above, in order to fulfill the positioning of a driven gear wheel around an axial line with respect to a crankshaft, a woodruff key is fitted in a keyway provided on an outer periphery of a balancer shaft at a portion wherein the balancer shaft is fitted and a keyway provided on an inner periphery of an attachment hole is provided in the driven gear wheel for fitting the balancer shaft therein. This gives rise to the necessity to upsize the balancer shaft as the transmission torque between the driven gear wheel and the balancer shaft increases.

SUMMARY AND OBJECTS OF THE INVENTION

The present invention has been made taking such a circumference as just described into consideration, and it is an object of an embodiment of the present invention to provide a balancer apparatus for an internal combustion engine which can avoid upsizing of a balancer shaft while the coupling strength between a driven gear wheel and the balancer shaft is increased.

According to an embodiment of the present invention, between a crankshaft supported for rotation on a crankcase which configures part of an engine main body and a balancer shaft which has balance weights thereon and is supported for rotation on the crankcase so as to have an axial line parallel to the crankshaft, a gear transmission mechanism including a driven gear wheel fixed to the balancer shaft is provided. The balancer apparatus for an internal combustion engine being configured such that the balancer shaft is formed so as to have a pair of bearing portions supported for rotation on the crankcase and a gear wheel supporting portion disposed on the outer side of the crankcase in a continuing relationship to one of the bearing portions and formed in a tapering shape such that a diameter thereof decreases away from the one bearing portion, that a tubular boss portion is provided integrally on the driven gear wheel and has a tapering attachment hole in which the gear wheel supporting portion is fitted. In addition, a fitting recessed portion is provided in which a pin which has an axial line along a radial direction of the balancer shaft and is fitted at a half portion on one end side thereof in a large diameter end portion of the gear wheel supporting portion is fitted at a half portion on the other end side thereof is provided on the boss portion on the large diameter end side of the attachment hole.

According to an embodiment of the present invention, a sub gear wheel for cooperating with the driven gear wheel to absorb a backlash is mounted on the boss portion on the smaller diameter end side of the attachment hole with an elastic member interposed between the sub gear wheel and the driven bear wheel.

According to an embodiment of the present invention, the balance weights are provided on the balancer shaft in a concentrated manner at one portion of a plane which includes an axial line of the balancer shaft, and the fitting position of the pin in the gear wheel supporting portion is determined such that the pin is directed upwardly in a phase of rotation which depends upon a self-weight of the balance weights in a natural state in which the axial line of the balancer shaft lies horizontally.

According to an embodiment of the present invention, a fastening member which is screwed in the gear wheel supporting portion so as to press an end face of the boss portion in a direction in which the gear wheel supporting portion is fitted into the attachment hole has provided thereon an engaging portion with which a rotary shaft provided in a first auxiliary apparatus is fitted against relative rotation.

According to an embodiment of the present invention, a second auxiliary apparatus is coaxially connected against relative rotation to an end portion of the balancer shaft on the opposite side to the gear wheel supporting portion.

It is to be noted that a pump unit 138 in the embodiment corresponds to the second auxiliary apparatus in the present invention; a spring 195 in the embodiment corresponds to the elastic member in the present invention; a bolt 197 in the embodiment corresponds to the fastening member in the present invention; a water pump 198 in the embodiment corresponds to a first auxiliary apparatus in the present invention; and a water pump shaft 199 in the embodiment corresponds to the rotary shaft in the present invention.

According to an embodiment of the present invention, the tapering gear wheel supporting portion provided on the balancer shaft is fitted in the tapering attachment hole of the boss portion having the driven gear wheel. Further, the pin having the axial line along the radial direction of the balancer shaft is provided between the gear wheel supporting portion and the boss portion. Therefore, the balancer apparatus for an internal combustion engine has a structure which does not include a keyway. Therefore, the continuity of the tapering faces of the outer circumference of the gear wheel supporting portion and the inner circumference of the attachment hole is assured to achieve enhancement of the productivity. Further, positioning of the driven gear wheel around the axial line of the boss portion and the gear wheel supporting portion can be firmly achieved. Consequently, an increase of the transmission torque can be anticipated while upsizing of the balancer shaft is prevented.

According to an embodiment of the present invention, the sub gear wheel for cooperating with the driven gear wheel to absorb a backlash is mounted on the boss portion of the driven gear wheel on the smaller diameter end side of the attachment hole. Therefore, there is no possibility of interference of the sub gear wheel with the portion which plays a role for positioning the driven gear wheel and the gear wheel supporting portion. Consequently, a degree of freedom in the shape of the sub gear wheel can be assured and the assembling property can be enhanced.

According to an embodiment of the present invention, the pin is directed upwardly in the phase of rotation which depends upon the self-weight of the balance weights in the natural state in which the axial line of the balancer shaft lies horizontally. Therefore, when the boss portion of the driven gear wheel is assembled to the gear wheel supporting portion of the tapering shape, even if the pin is provided at the position on the rear face side of the driven gear wheel, phase adjustment of the balancer shaft to the driven gear wheel, and hence, phase adjustment of the balancer shaft to the crankshaft, is facilitated. Thus, assembling is improved.

According to an embodiment of the present invention, the rotary shaft of the first auxiliary apparatus is engaged against relative rotation with the fastening member which is screwed in the gear wheel supporting portion so as to fix the driven gear wheel to the gear wheel supporting portion. Therefore, a reduction in size of the balancer shaft can be maintained even against an increase of the load to act upon the balancer shaft from the first auxiliary apparatus.

According to an embodiment of the present invention, the different auxiliary apparatus are connected against relative rotation to the opposite end portions of the balancer shaft. Therefore, even if the load to act upon the balancer shaft increases, reduction in size of the balancer shaft can be maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described with reference to the accompanying drawings. It is to be noted that the terms of front, rear, left, right, up, and down are used to represent directions as viewed from an occupant on a four-wheel drive vehicle for off road operation.

Figure 1:
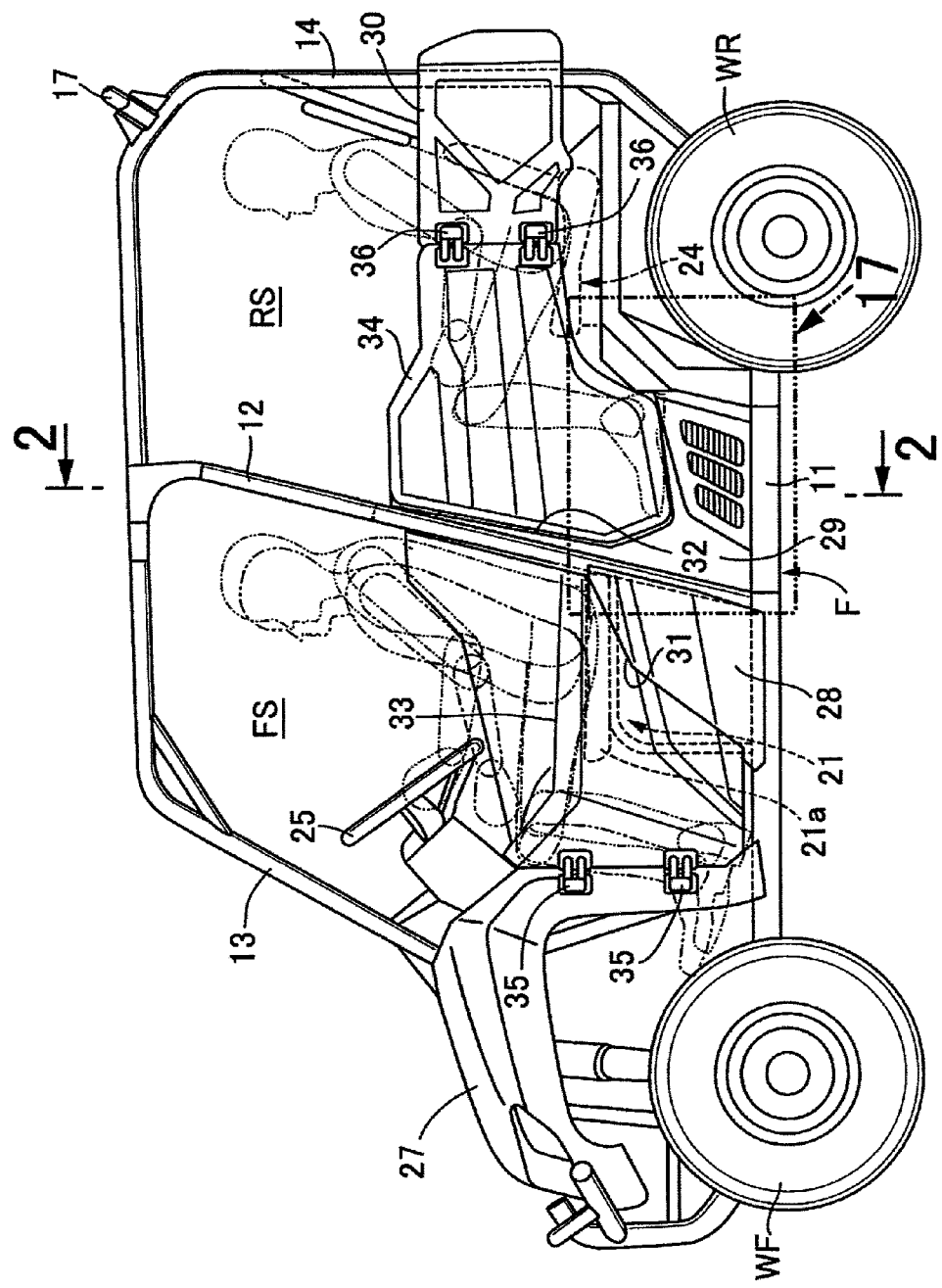
FIG. 1 is a side elevational view of a four-wheel drive vehicle for off road operation.
Figure 2:
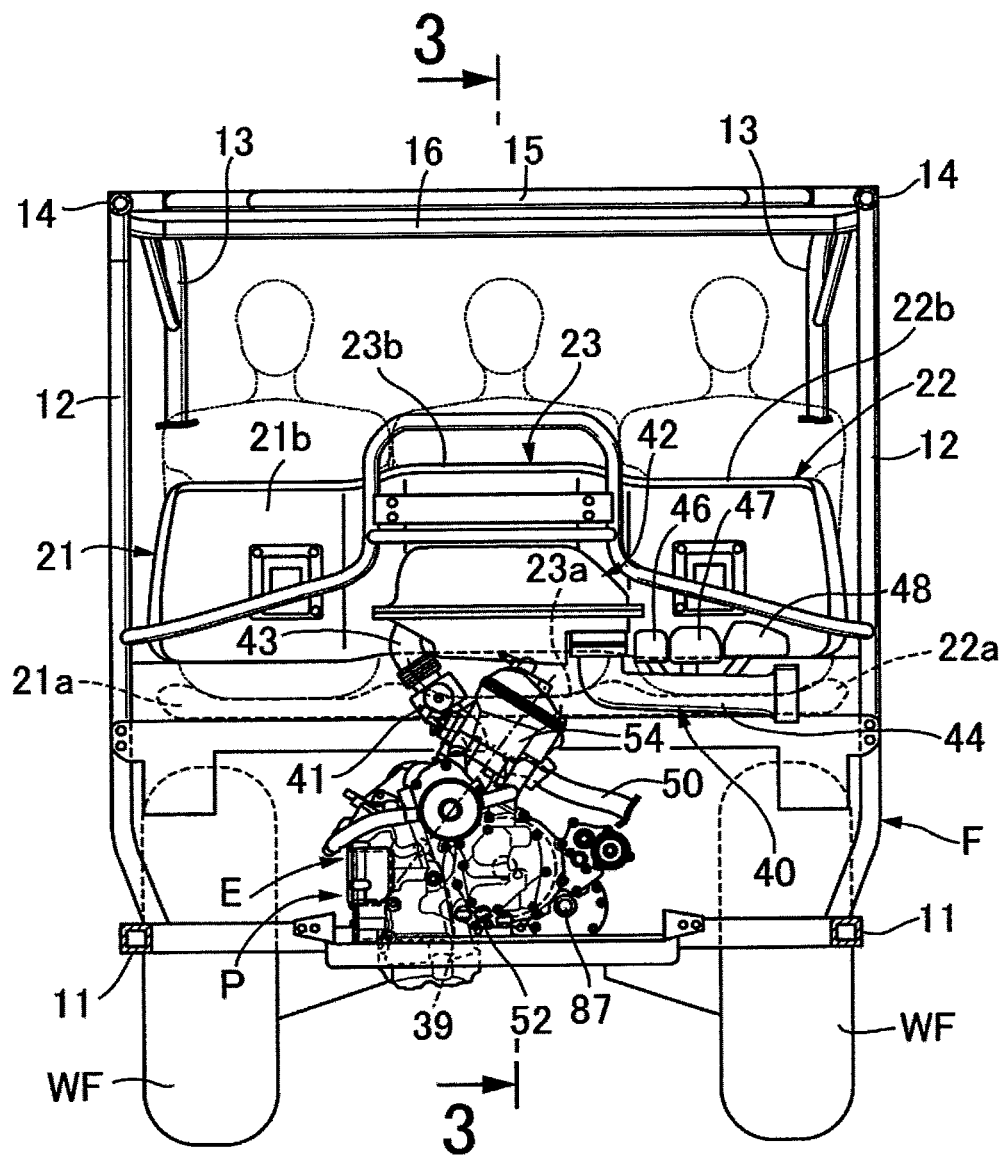
FIG. 2 is a sectional view taken along line 2-2 of FIG. 1.
Figure 3:
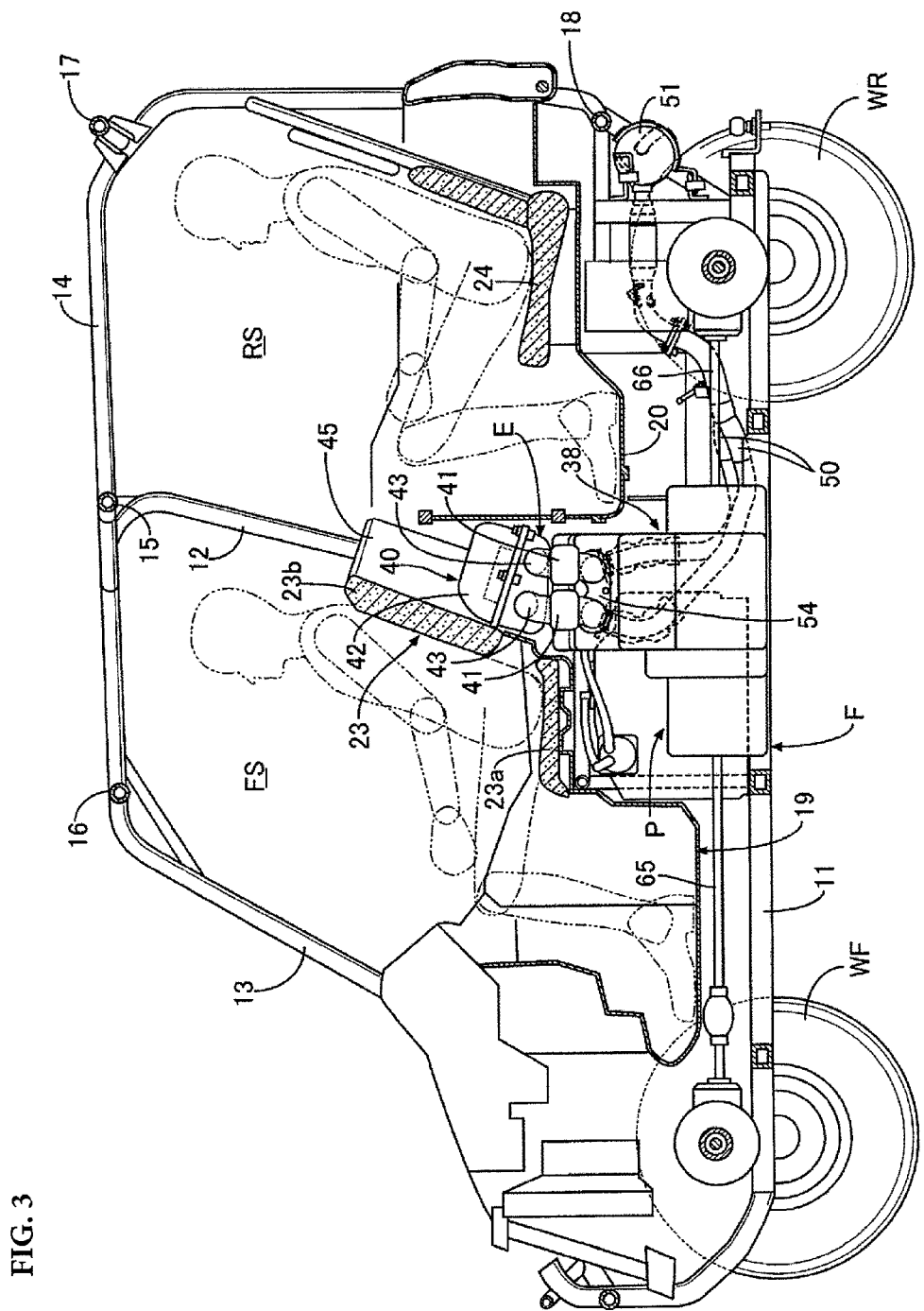
FIG. 3 is a sectional view taken along line 3-3 of FIG. 2.

Referring first to FIGS. 1 to 3, a pair of left and right front wheels WF are suspended at a front portion of a vehicle body frame F of a four-wheel drive vehicle for off road operation in the form of a four-wheeled vehicle. A pair of left and right rear wheels WR are suspended at a rear portion of the vehicle body frame F.

The vehicle body frame F includes a pair of left and right lower frames 11, a pair of left and right center upright frames 12, a pair of left and right front side frames 13, a pair of left and right rear side frames 14, a center cross member 15, a front cross member 16, an upper rear cross member 17, and a lower rear cross member 18. The lower frames 11 extend in the forward and rearward direction, and the center upright frames 12 extend upwardly from an intermediate portion of the lower frames 11 in the forward and rearward direction. The front side frames 13 extend forwardly from an upper end of the center upright frames 12 and extend forwardly downwardly from a middle portion thereof until they are connected to a front portion of the lower frames 11. The rear side frames 14 extend rearwardly from an upper end of the center upright frames 12 and extend downwardly from a middle portion thereof until they are connected to a rear end of the lower frames 11. The center cross member 15 connects upper end portions of the pair of left and right center upright frames 12 to each other, and the front cross member 16 connects intermediate bent portions of the pair of left and right front side frames 13 to each other. The upper rear cross member 17 connects intermediate bent portions of the pair of left and right rear side frames 14, and the lower rear cross member 18 connects lower portions of the pair of left and right rear side frames 14 to each other.

It is to be noted that the pair of left and right center upright frames 12 and the pair of left and right front side frames 13 configure an outer shell of a front boarding space FS for a driver and a front passenger. A front floor 19 is supported at a front portion of the vehicle body frame F and is disposed in front of the center upright frames 12 so as to allow the driver and the front passenger to get thereon. Further, the pair of left and right center upright frames 12 and the pair of left and right rear side frames 14 configure an outer shell for a rear boarding space RS for fellow passengers. A rear floor 20 is supported at a rear portion of the vehicle body frame F and is disposed behind the center upright frames 12 so as to allow the fellow passengers to get thereon.

In the front boarding space FS for a driver and a front passenger, a driver's seat 21 and a front passenger seat 22 are disposed in a spaced relationship from each other in the vehicle widthwise direction. The driver's seat 21 is disposed behind a steering wheel 25 for steering the pair of left and right front wheels WF, and the front passenger seat 22 is disposed on one side in the leftward and rightward direction (in the present embodiment, on the right side) of the driver's seat 21.

Each of the driver's seat 21 and the front passenger seat 22 includes a seat portion 21a or 22a, and a backrest portion 21b or 22b which extends upwardly from a rear portion of the seat portion 21a or 22a. Further, a second front passenger seat 23 is provided between the driver's seat 21 and the front passenger seat 22 and has a backrest portion 23b and a seat portion 23a. The backrest portion 23b is displaced forwardly with respect to the backrest portions 21b and 22b of the driver's seat 21 and the front passenger seat 22, and the seat portion 23a is disposed between the seat portions 21a and 22a of the driver's seat 21 and the front passenger seat 22. Meanwhile, a pair of left and right rear passenger seats 24 are provided in the rear boarding space RS for fellow passengers.

In addition, a front portion of the vehicle body frame F is covered with a front cover 27, and a front side cover 28, a pair of left and right center side covers 29 and a pair of left and right rear side covers 30 are attached to the vehicle body frame F. The front side cover 28 covers a rear side lower portion of the front boarding space FS from the sides, and the center side covers 30 cover a front side lower portion of the rear boarding space RS from the sides. The rear side covers 30 cover a rear side lower portion of the rear boarding space RS from the sides. Further, a pair of left and right front doors 33 are supported for pivotal motion at left and right rear portions of the front cover 27 by a pair of upper and lower hinge portions 35. The front doors 33 are capable of opening and closing front doorways 31 formed between the front side cover 28 and the front cover 27. A rear door 34 is supported for pivotal motion at a front portion of each rear side cover 30 by a pair of upper and lower hinge portions 36. The rear door 34 is capable of opening and closing a rear doorway 32 formed between the center side cover 29 and the rear side cover 30.

A two-cylinder internal combustion engine E is mounted on the vehicle body frame F such that it is disposed substantially centrally in the forward and rearward direction of the vehicle as viewed in plan. The internal combustion engine E exerts power for driving the pair of left and right front wheels WF and the pair of left and right rear wheels WR to rotate. An engine main body 38 of the internal combustion engine E is postured such that it is laid in an upright position in which an axial line of a crankshaft 39 extends along the forward and rearward direction and a cylinder axial line C is inclined to the front passenger seat 22 side in the vehicle widthwise direction. The engine main body 38 is disposed below the driver's seat 21 and the front passenger seat 22 at a central location in the vehicle widthwise direction.

An intake system 40 in the internal combustion engine E includes a throttle body 41, an air cleaner 42, a pair of connecting tubes 43 and a single intake duct 44. The throttle body 41 is connected for each cylinder to a cylinder head 54 of the engine main body 38. The air cleaner 42 is disposed between the driver's seat 21 and the front passenger seat 22 as viewed in a plan view. The connecting tubes 43 connect the throttle body 41 and the air cleaner 42 to each other. The intake duct 44 introduces air into the air cleaner 42.

In addition, the backrest portion 23b of the second front passenger seat 23 provided between the driver's seat 21 and the front passenger seat 22 is integrally continuous to the backrest portions 21b and 22b of the driver's seat 21 and the front passenger seat 22 and is displaced forwardly with respect to the backrest portions 21b and 22b. The backrest portions 21b, 22b and 23b of the driver's seat 21, front passenger seat 22 and second front passenger seat 23 form a recessed portion 45 which is recess to the front side as viewed in plan. The air cleaner 42 described hereinabove is disposed in the recessed portion 45.

The intake duct 44 is connected at the downstream end thereof to a right side portion of the air cleaner 42 and extends to a right side portion of the vehicle body behind the seat portion 22b of the front passenger seat 22. A plurality of resonators 46, 47 and 48 are connected to different locations of the intake duct 44.

A pair of exhaust pipes 50 are connected to a lower portion side wall of the cylinder head 54 of the engine main body 38 and are connected to an exhaust muffler 51. The exhaust muffler 51 is supported on the vehicle body frame F and disposed so as to extend in the vehicle widthwise direction along a rear edge of the vehicle body frame F.

Figure 4:
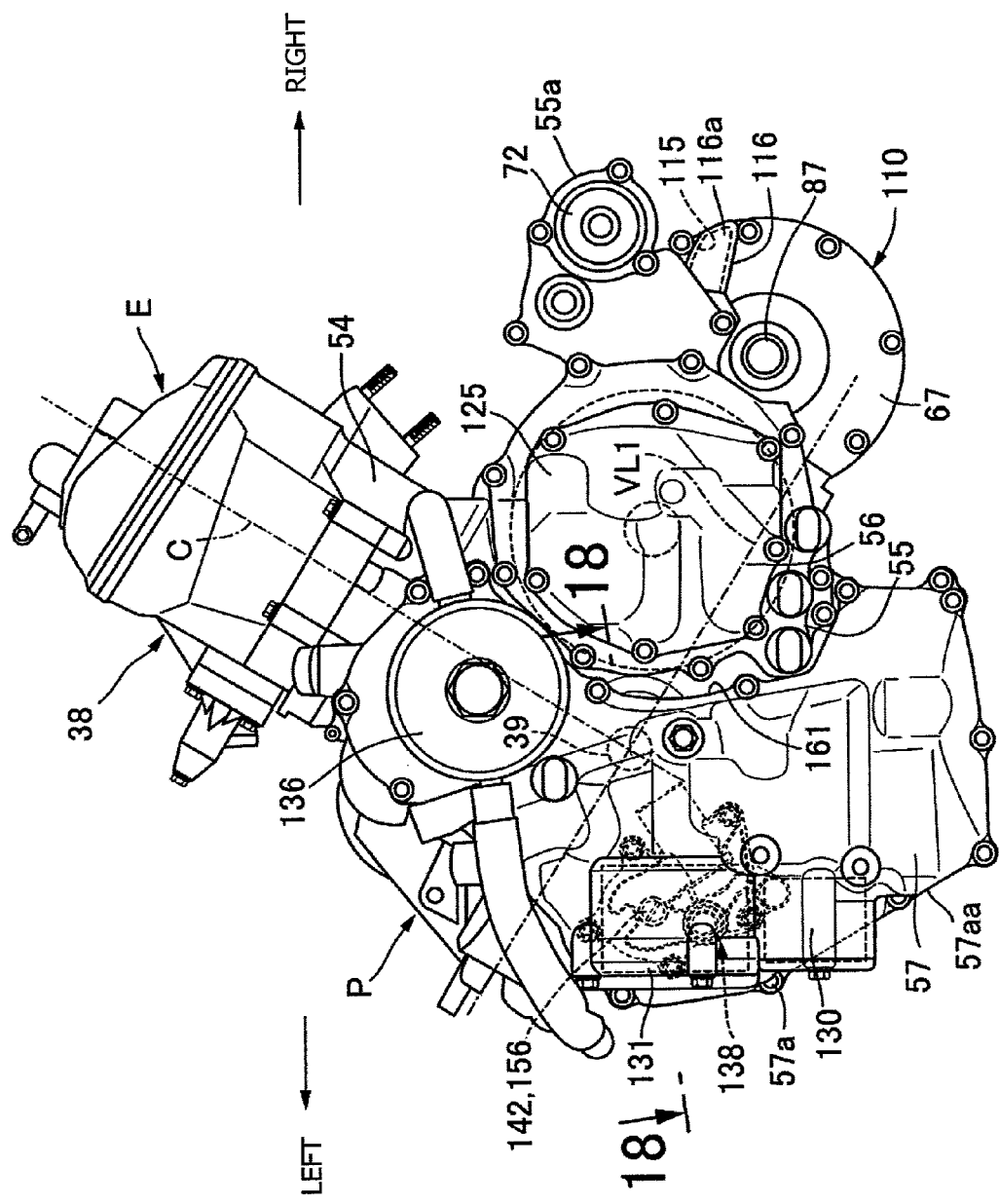
FIG. 4 is a rear elevational view of a power unit as viewed from the rear of the vehicle.
Figure 5:
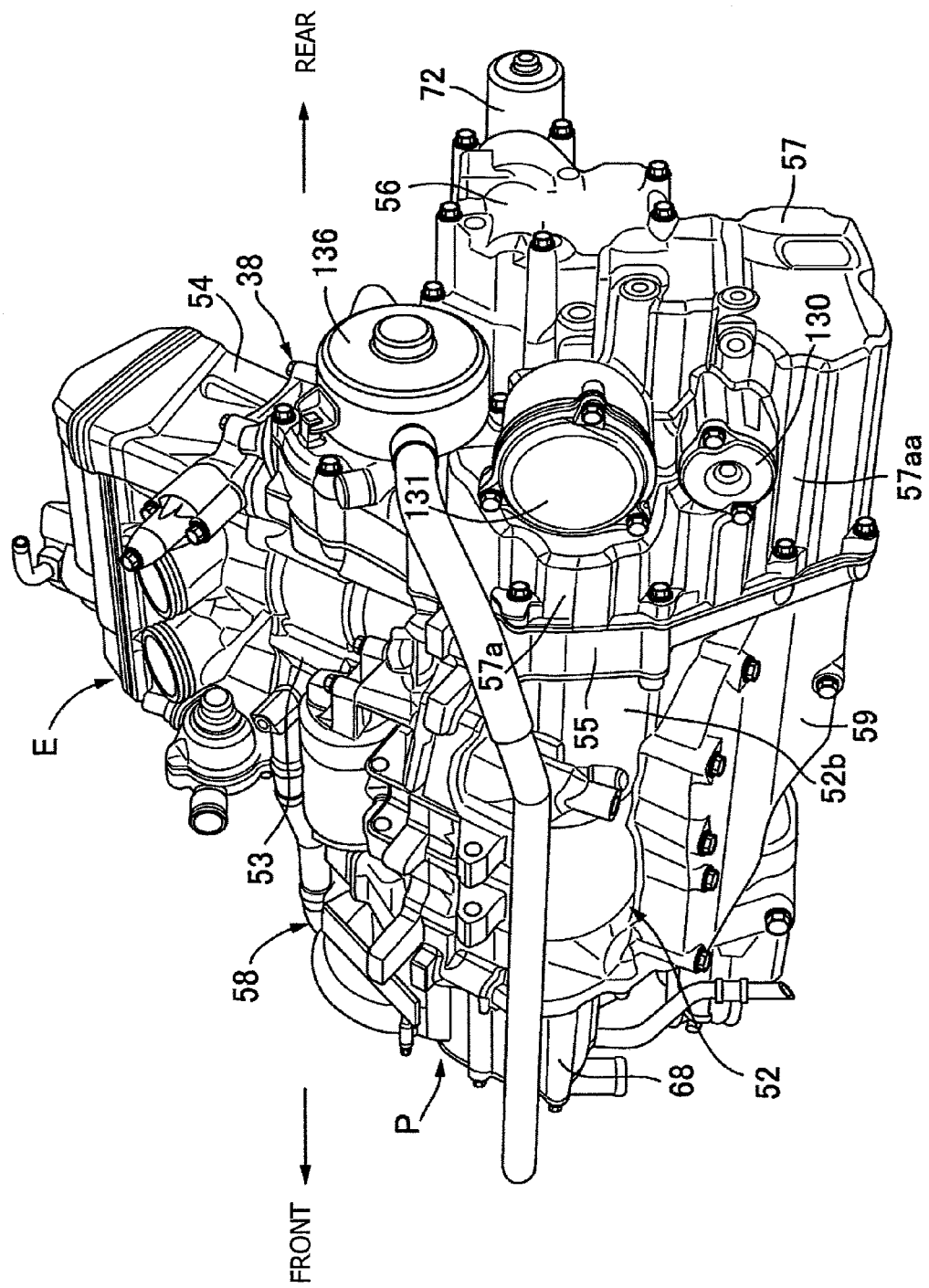
FIG. 5 is a perspective view of the power unit as viewed from the oblique left rear.

Referring to FIGS. 4 and 5, the engine main body 38 has a crankcase 52, a cylinder block 53 and the cylinder head 54. The crankcase 52 supports the crankshaft 39, which extends in the forward and rearward direction of the vehicle, for rotation thereon. The cylinder block 53 is coupled to the crankcase 52 and has the inclined cylinder axial line C described above. The cylinder head 54 is coupled to an upper portion of the cylinder block 53. The crankcase 52 is configured from a upper case portion 52a and a lower case member 52b coupled to each other on a coupling plane along a plane VL1 orthogonal to the cylinder axial line C. The upper case portion 52a and the cylinder block 53 are formed integrally with each other. Further, the crankshaft 39 is supported for rotation between the upper case portion 52a and the lower case member 52b such that an axial line thereof is orthogonal to the cylinder axial line C on the plane VL1.

A spacer plate 55 is coupled to a rear face of the crankcase 52 and forms part of the engine main body 38. A clutch cover 56 and an oil reserving tank 57 are coupled to the crankcase 52 through the spacer plate 55 such that they project rearwardly from the crankcase 52. Further, an auxiliary transmission case 58 is coupled to the opposite side of the crankshaft 39 to the oil reserving tank 57 with respect to the axial line of the crankshaft 39, namely, on the front face side of the crankcase 52. An oil pan 59 is coupled to a lower portion of the crankcase 52.

Figure 6:
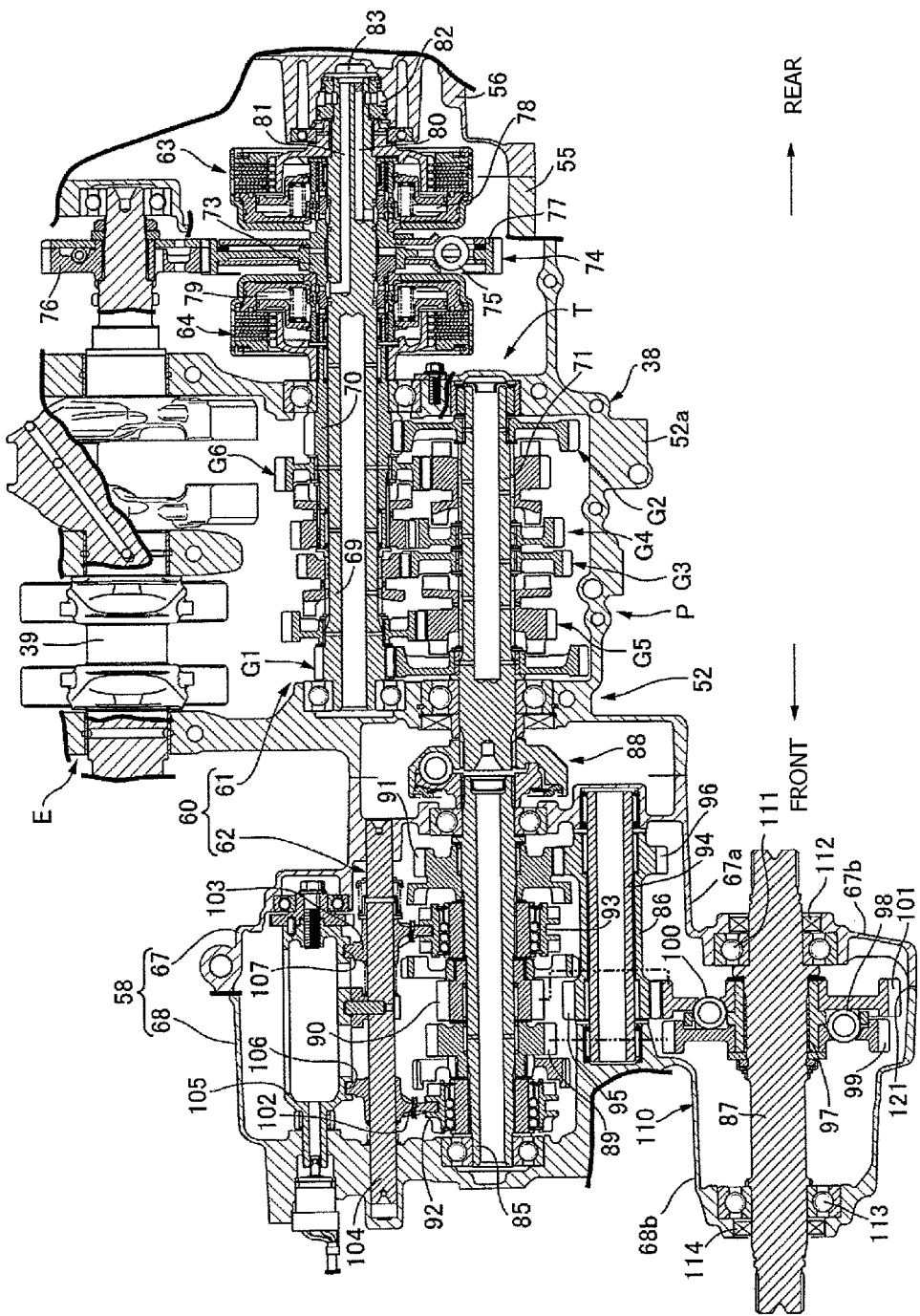
FIG. 6 is an expanded cross-sectional view of a power transmission system of the power unit.

Referring to FIG. 6, a power transmission apparatus T is provided midway of a power transmission system between the crankshaft 39 of the internal combustion engine E and the front wheels WF and rear wheels WR which are all driving wheels. The power transmission apparatus T configures a power unit P together with the internal combustion engine E. The power transmission apparatus T includes a transmission 60, and first and second hydraulic clutches 63 and 64 interposed between the transmission 60 and the crankshaft 39.

Output power from the power unit P is transmitted to the left and right front wheels WF through a front wheel propeller shaft 65 (refer to FIG. 3) extending in the forward and rearward direction and is transmitted to the left and right rear wheels WR through a rear wheel propeller shaft 66 (refer to FIG. 3) extending in the forward and rearward direction. The front wheel propeller shaft 65 and the rear wheel propeller shaft 66 are disposed such that they pass on the right side of the crankcase 52.

The transmission 60 includes a main transmission 61 accommodated in the crankcase 52, and an auxiliary transmission 62 accommodated in the auxiliary transmission case 58. The auxiliary transmission case 58 is configured from a first case member 67 coupled to the front face of the crankcase 52 and a second case member 68 cooperating with the crankcase 52 to sandwich the first case member 67 therebetween.

The main transmission 61 includes a first main shaft 69, a second main shaft 70, a countershaft 71, first, third and fifth speed gear trains G1, G3 and G5, and second, fourth and sixth speed gear trains G2, G4 and G6. The first main shaft 69 and the second main shaft 70 are input power shafts from the crankshaft 39 to the transmission 60. The first, third and fifth speed gear trains G1, G3 and G5 are provided for selective establishment between the first main shaft 69 and the countershaft 71. Meanwhile, the second, fourth and sixth speed gear trains G2, G4 and G6 are provided for selective establishment between the second main shaft 70 and the countershaft 71.

The first and second main shafts 69 and 70 are supported for relative rotation on the upper case portion 52a of the crankcase 52 such that the second main shaft 70 coaxially surrounds part of the first main shaft 69. The first and second main shafts 69 and 70 are disposed on the right side with respect to the crankshaft 39 so as to have axial lines parallel to the crankshaft 39. Meanwhile, the countershaft 71 is supported for rotation on the upper case portion 52a of the crankcase 52 such that it has an axial line parallel to the first and second main shafts 69 and 70.

Selective establishment of the first to sixth speed gear trains G1 to G6 is changed over by operation of a speed changing electric motor 72. The speed changing electric motor 72 is attached to a sideward projection 55a provided on the spacer plate 55 in such a manner so as to project to the right side from the clutch cover 56 as clearly depicted in FIG. 4.

A power transmission cylindrical shaft 73 is supported for relative rotation but against relative movement in an axial direction at a position of the first main shaft 69 adjacent the second main shaft 70 on the rear side in the axial direction. The power transmission cylindrical shaft 73 coaxially surrounds the first main shaft 69. The first hydraulic clutch 63 is provided on the first main shaft 69 such that it can carry out changeover between connection and disconnection of power between the power transmission cylindrical shaft 73 and the first main shaft 69. The second hydraulic clutch 64 is provided on the power transmission cylindrical shaft 73 and the second main shaft 70 such that it can carry out changeover between connection and disconnection of power between the power transmission cylindrical shaft 73 and the second main shaft 70.

To the power transmission cylindrical shaft 73, rotational power from the crankshaft 39 is transmitted through a primary reduction apparatus 74 and a damper spring 75. The primary reduction apparatus 74 is configured from a primary driving gear wheel 76 which rotates together with the crankshaft 39 and a primary driven gear wheel 77 disposed coaxially with the first and second main shafts 69 and 70 and held in meshing engagement with the primary driving gear wheel 76. The primary driven gear wheel 77 is connected to the power transmission cylindrical shaft 73 through the damper spring 75.

The first hydraulic clutch 63 has a first hydraulic chamber 78 and is disposed on the outer side in the axial direction with respect to the primary reduction apparatus 74. In a state in which hydraulic pressure does not act upon the first hydraulic chamber 78, the first hydraulic clutch 63 is in a clutch-off state in which power transmission is cut off. However, when hydraulic pressure acts upon the first hydraulic chamber 78, the first hydraulic clutch 63 is in a clutch-on state in which rotational power transmitted thereto from the crankshaft 39 through the primary reduction apparatus 74, damper spring 75 and power transmission cylindrical shaft 73 is transmitted to the first main shaft 69.

The second hydraulic clutch 64 has a second hydraulic chamber 79 and is disposed on the inner side in the axial direction with respect to the first hydraulic clutch 63 in such a manner so as to cooperate with the first hydraulic clutch 63 to sandwich the primary reduction apparatus 74 therebetween. In a state in which hydraulic pressure does not act upon the second hydraulic chamber 79, the second hydraulic clutch 64 is in a clutch-off state in which power transmission is cut off. However, when hydraulic pressure acts upon the second hydraulic chamber 79, the second hydraulic clutch 64 is in a clutch-on state in which rotational power transmitted thereto from the crankshaft 39 through the primary reduction apparatus 74, damper spring 75 and power transmission cylindrical shaft 73 is transmitted to the second main shaft 70.

First and second axial oil paths 80 and 81 are provided in the first main shaft 69 such that they extend in parallel to each other in an axial direction and are closed at the inner end thereof. The first axial oil path 80 is communicated with the first hydraulic chamber 78 while the second axial oil path 81 is communicated with the second hydraulic chamber 79. In addition, a first oil path 82 communicating with the first axial oil path 80 and a second oil path 83 communicating with the second axial oil path 81 are formed in the clutch cover 56.

The auxiliary transmission 62 includes a speed change drive shaft 85, an idle shaft 86 and a driving force output power shaft 87. The speed change drive shaft 85 is provided coaxially with the countershaft 71 of the main transmission 61 and extends in the forward and rearward direction. The speed change drive shaft 85 is supported for rotation on the first and second case members 67 and 68 of the auxiliary transmission case 58. In addition, the speed change drive shaft 85 has a rear end portion penetrating for rotation through the first case member 67 and projecting to the crankcase 52 side. The countershaft 71 penetrates for rotation through the crankcase 52 and is coaxially connected to a rear end portion of the speed change drive shaft 85 through a damper mechanism 88. In particular, rotational power of the countershaft 71 is transmitted to the speed change drive shaft 85 through the damper mechanism 88.

Within the auxiliary transmission case 58, a high speed driving gear wheel 89, a low speed driving gear wheel 90 and a reverse driving gear wheel 91 are supported for relative rotation on the speed change drive shaft 85 and are disposed in this order from the front side. A high speed switching shifter 92 is supported for sliding movement on the speed change drive shaft 85 between the second case member 68 and the high speed driving gear wheel 89 against relative rotation to the speed change drive shaft 85. In particular, the high speed switching shifter 92 is supported such that it can be changed over between a position at which it is engaged with the high speed driving gear wheel 89 and a neutral position at which it is disengaged from the high speed driving gear wheel 89. Meanwhile, a forward-backward switching shifter 93 is supported for sliding movement on the speed change drive shaft 85 between the low speed driving gear wheel 90 and the reverse driving gear wheel 91 against relative rotation to the speed change drive shaft 85. In particular, the forward-backward switching shifter 93 is supported such that it can be changed over among a position at which it is engaged with the low speed driving gear wheel 90, another position at which it is engaged with the reverse driving gear wheel 91 and a neutral position at which it is not engaged with any of the low speed driving gear wheel 90 and the reverse driving gear wheel 91.

The idle shaft 86 is formed as a cylindrical member which surrounds a support shaft 94 which is supported for relative rotation on the first and second case members 67 and 68 of the auxiliary transmission case 58, and is supported for rotation on the support shaft 94. A small diameter idle gear wheel 95 and a large diameter idle gear wheel 96 are provided integrally at a front portion and a rear portion of the idle shaft 86 within the auxiliary transmission case 58, respectively. The large diameter idle gear wheel 96 is held in meshing engagement with the reverse driving gear wheel 91.

A boss 97 is fixed to the driving force output power shaft 87 such that it is disposed at a position corresponding to the small diameter idle gear wheel 95 and the high speed driving gear wheel 89 and low speed driving gear wheel 90 of the speed change drive shaft 85. The boss 97 is in a cylindrical shape. To the boss 97, a small diameter driven gear wheel 99 is connected through a damper spring 98 and a large diameter driven gear wheel 101 is connected through a damper spring 100. The high speed driving gear wheel 89 meshes with the small diameter driven gear wheel 99, and the low speed driving gear wheel 90 and the small diameter idle gear wheel 95 mesh with the large diameter driven gear wheel 101.

The high speed switching shifter 92 is retained for rotation by a first shift fork 102 and the forward-backward switching shifter 93 is retained for rotation by a second shift fork 103. The first shift fork 102 and the second shift fork 103 are supported for sliding movement on a shift fork shaft 104 supported on the first and second case members 67 and 68 of the auxiliary transmission case 58 having an axial line parallel to the speed change drive shaft 85. Further, a shift drum 105 is supported for rotation on the first and second case members 67 and 68 such that it has an axial line parallel to the shift fork shaft 104. Guide grooves 106 and 107 are provided on an outer periphery of the shift drum 105 and are engaged by the first and second shift forks 102 and 103, respectively.

When the shift drum 105 rotates, the first and shift forks 102 and 103 are moved along the shift fork shaft 104 to selectively connect the high speed driving gear wheel 89, low speed driving gear wheel 90 and reverse driving gear wheel 91 against relative rotation to the speed change drive shaft 85.

Figure 7:
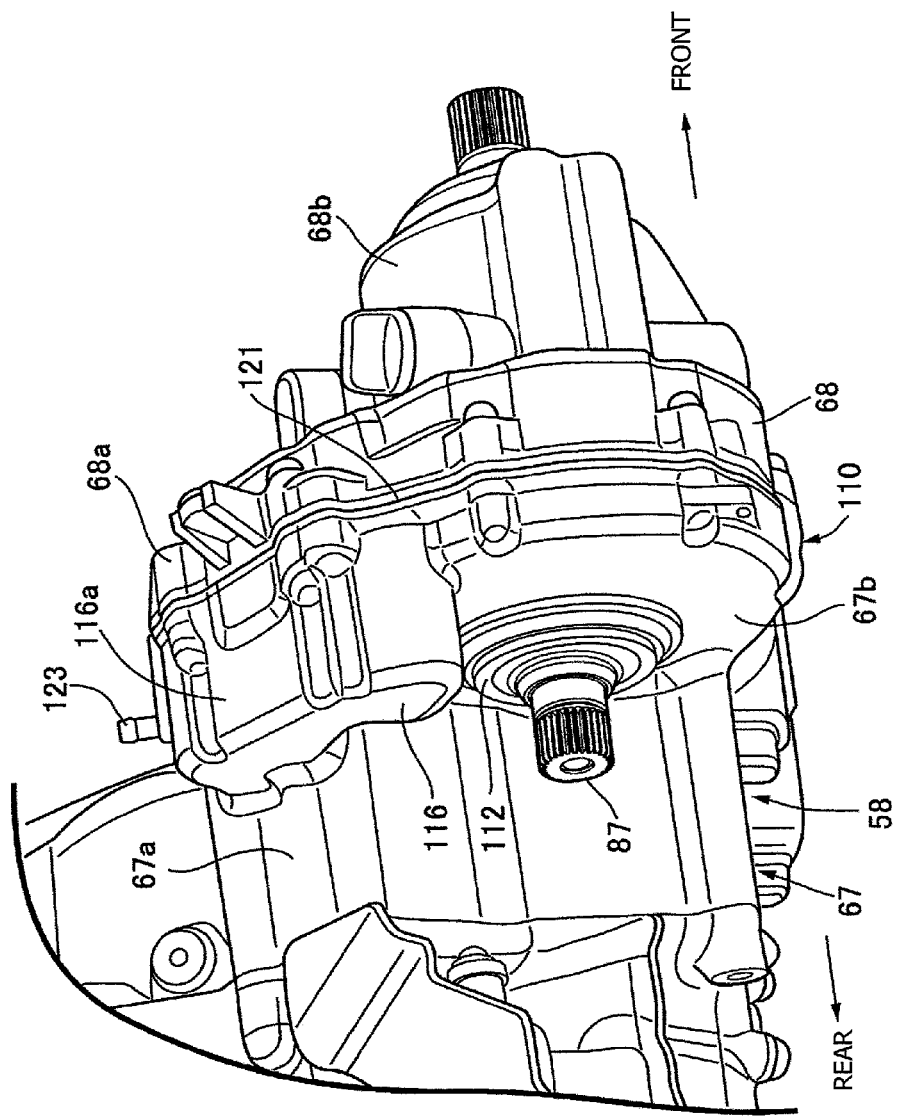
FIG. 7 is a perspective view of part of an auxiliary transmission case as viewed from the oblique right rear.
Figure 8:
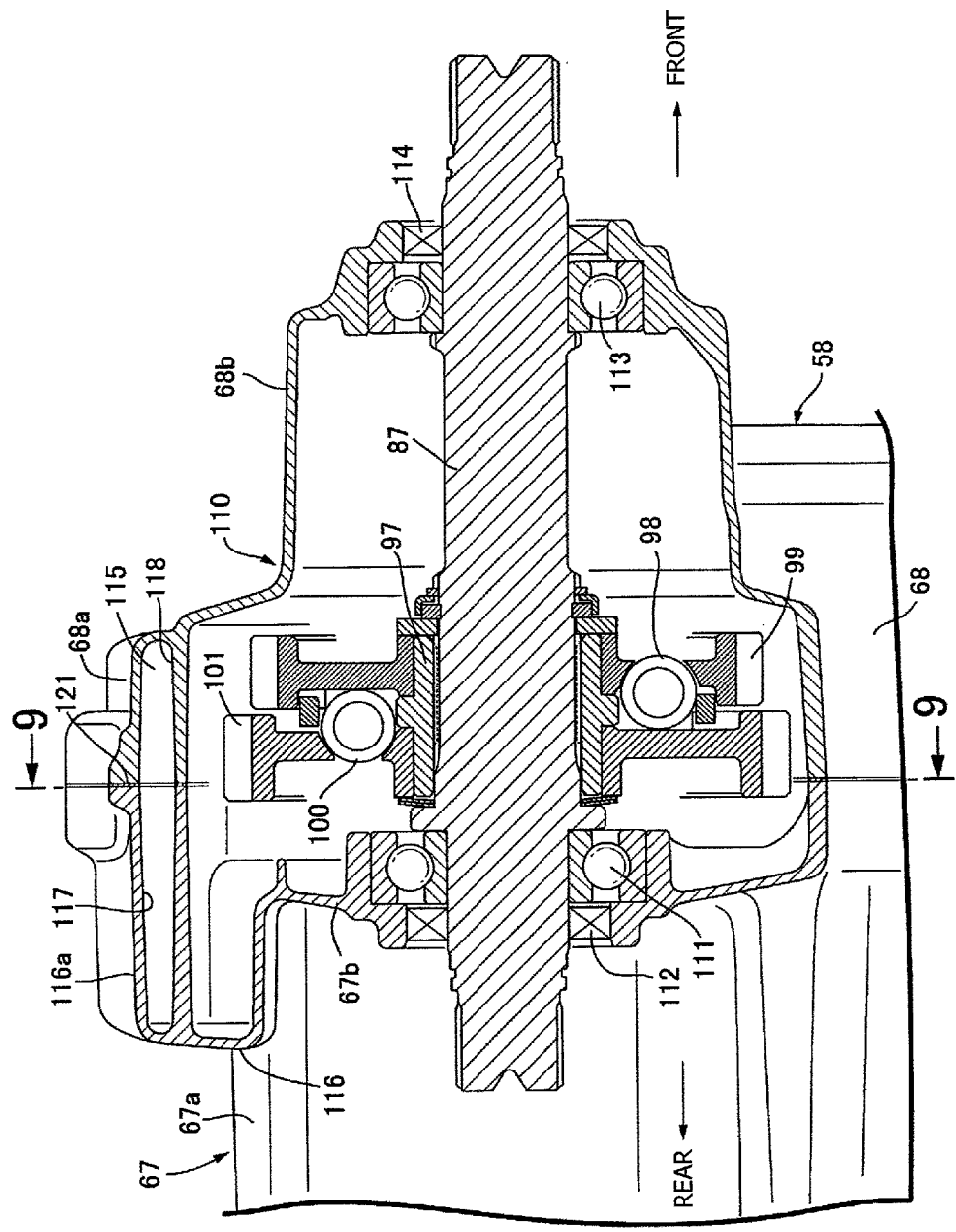
FIG. 8 is a longitudinal sectional view of part of the auxiliary transmission case and a driving force outputting shaft.

Referring also to FIGS. 7 and 8, the auxiliary transmission case 58 is adjacent from the front side and is coupled to the front face of the crankcase 52 which supports the first and second main shafts 69 and 70, which are input power shafts to the transmission 60, for rotation thereon. The auxiliary transmission case 58 has an output power shaft supporting portion 110 formed thereon such that it projects to the outer side from the crankcase 52. The driving force output power shaft 87 is supported for rotation on the output power shaft supporting portion 110 and is offset in an axial direction from the first and second main shafts 69 and 70. A rear end of the driving force output power shaft 87 extends for rotation through the output power shaft supporting portion 110 and projects rearwardly. Between the first case member 67 and the output power shaft supporting portion 110, a ball bearing 111 and an oil seal 112 disposed on the outer side of the ball bearing 111 are interposed. The rear wheel propeller shaft 66 is connected to a rear end portion of the output power shaft supporting portion 110 and passes along the right side of the crankcase 52. Meanwhile, a front portion of the driving force output power shaft 87 extends for rotation through the output power shaft supporting portion 110 and projects forwardly. Between the second case member 67 and the output power shaft supporting portion 110, a ball bearing 113 and an oil seal 114 disposed on the outer side of the ball bearing 113 are interposed. The front wheel propeller shaft 65 is connected to a front end portion of the output power shaft supporting portion 110 and passes along the right side of the crankcase 52.

In the auxiliary transmission case 58, the first case member 67 coupled to the crankcase 52 of the engine main body 38 and the second case member 68 are coupled to each other with a gasket 121 interposed therebetween such that the first case member 67 and second case member 68 can be decoupled from each other in the axial direction of the driving force output power shaft 87. A breather chamber 115 is formed between the first case member 67 and the second case member 68 such that it is disposed above a projection from the output power shaft supporting portion 110 at one end portion of the driving force output power shaft 87, in the present embodiment, above a projection from the output power shaft supporting portion 110 at a rear end portion of the driving force output power shaft 87.

In addition, the first case member 67 has a side wall 67*a* and a projection 67*b*. The side wall 67*a* faces in a projection direction of the output power shaft supporting portion 110 from the crankcase 52, namely, in the rightward direction. The projection 67*b* is provided integrally so as to project integrally to a side from the side wall 67*a*. The projection 67*b* cooperates with the second case member 68 to configure the output power shaft supporting portion 110.

A swollen portion 116 is provided integrally at a location of the first case member 67 corresponding to an upper portion of the output power shaft supporting portion 110 such that it is swollen to the opposite side to the second case member 68, namely, to the rear side. The swollen portion 116 has a breather chamber forming wall portion 116*a* provided at an upper portion of the swollen portion 116 such that it forms a recessed portion 117 open to the second case member 68 side. The breather chamber forming wall portion 116*a* is coupled to a breather chamber forming wall portion 68*a* provided at a position of an upper portion of the second case member 68 corresponding to the output power shaft supporting portion 110 so as to form a recessed portion 118 which is open to the first case member 67 side. The breather chamber 115 is formed from the recessed portions 117 and 118 which are in communication with each other. In addition, the swollen portion 116 is formed so as to integrally connect to the side wall 67*a* of the first case member 67.

On the second case member 68 of the auxiliary transmission case 58, a cylindrical portion 68*b* is formed integrally such that it extends in a forward direction along the axial direction of the driving force output power shaft 87 so as to cover the driving force output power shaft 87 from a side.

Figure 9:
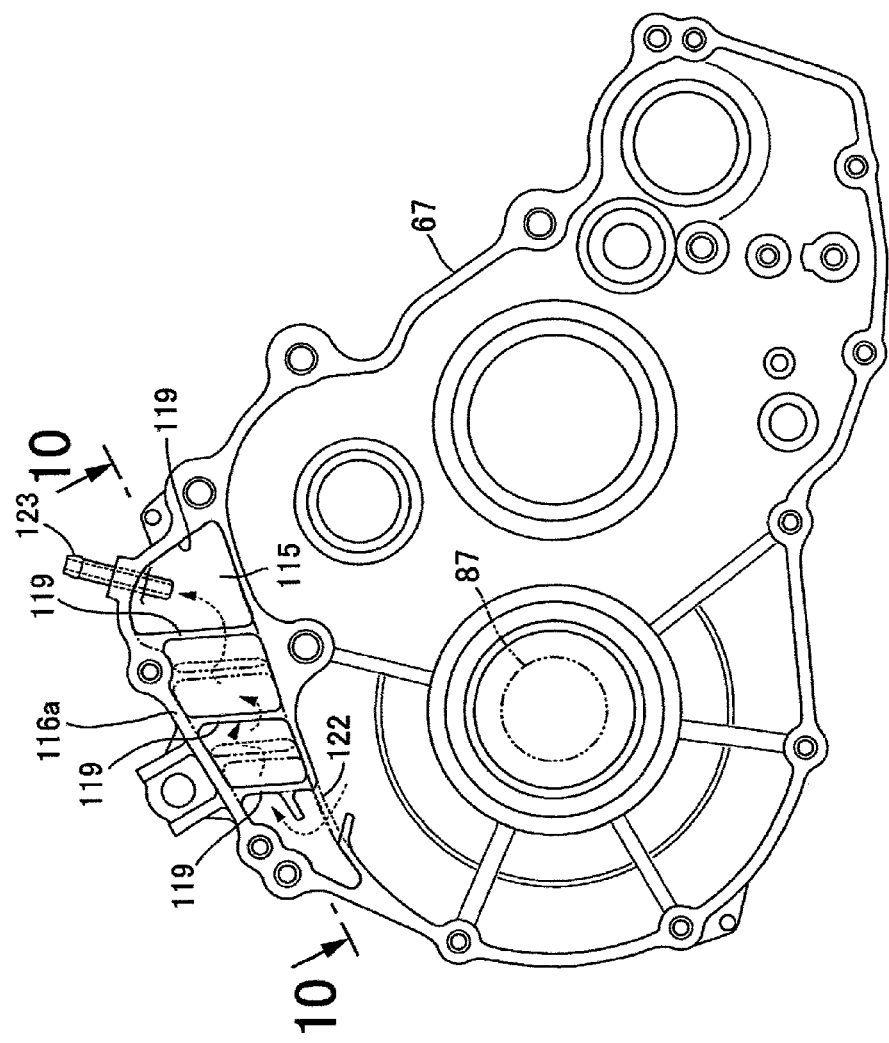
FIG. 9 is a view of a first case member as viewed in a direction indicated by an arrow mark 9-9 of FIG. 8.
Figure 10:
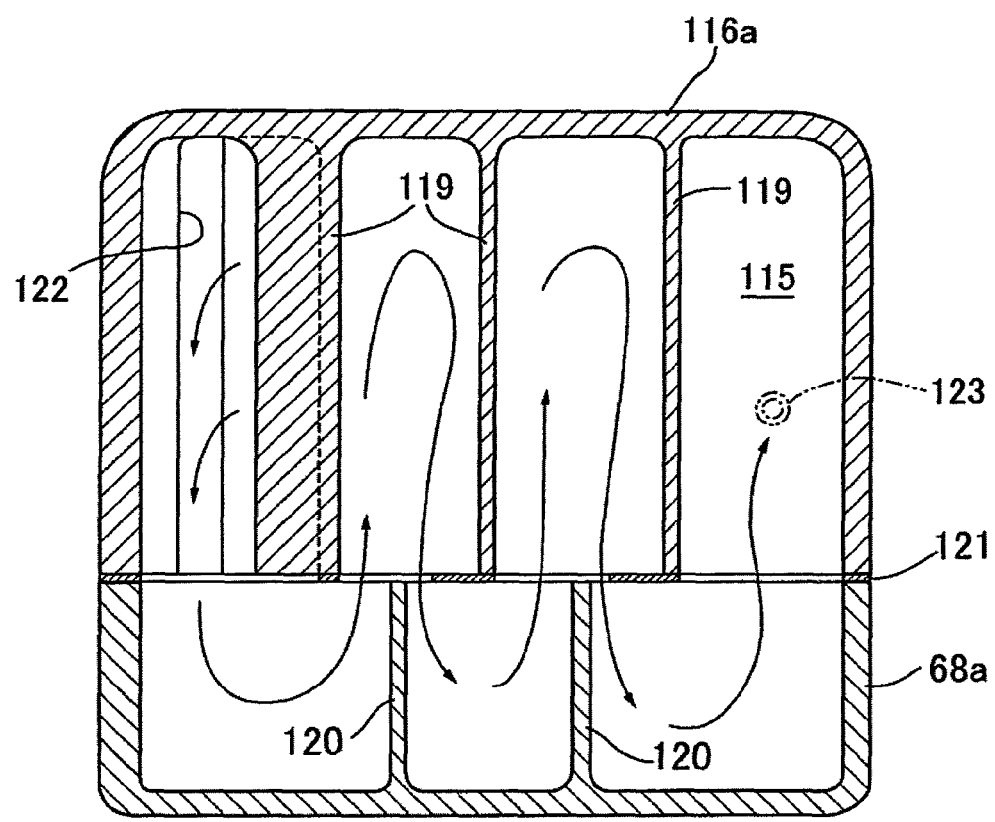
FIG. 10 is a sectional view of a breather chamber taken along line 10-10 of FIG. 9.

Referring also to FIGS. 9 and 10, in order to form a flow path in the breather chamber 115 as a labyrinth flow path, a plurality of partition walls 119 are formed integrally in a projecting manner on the first case member 67 and a plurality of partition walls 120 are integrally formed in a projecting manner on the second case member 68.

In addition, the breather chamber 115 is formed such that it exhibits a higher position toward the engine main body 38 in a state in which the power unit P is mounted on the vehicle body frame F. An inlet port 122 is provided in the breather chamber forming wall portion 116a such that it is communicated with a lowermost portion of the breather chamber 115. Gas introduced into the inlet port 122 flows in a zigzag fashion as indicated by arrow marks in FIGS. 9 and 10, whereupon it is separated into vapor and liquid. Then, the gas circulates upwardly in the breather chamber 115 and then is derived from an outlet pipe 123. The outlet pipe 123 is provided in the breather chamber forming wall portion 116a such that it is communicated with an uppermost portion of the breather chamber 115.

Figure 11:
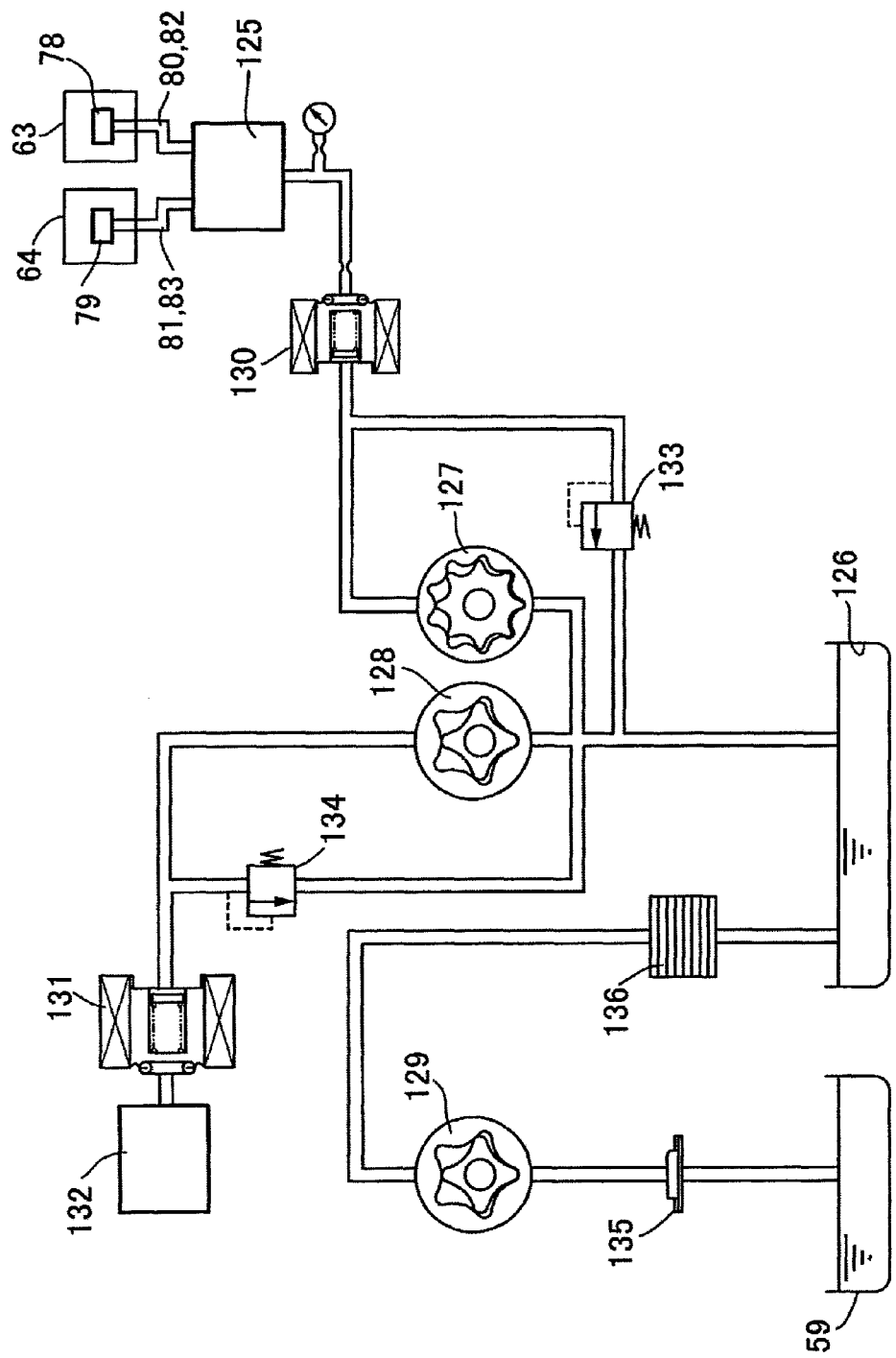
FIG. 11 is a view depicting an oil circulation system.

Referring to FIG. 11, the first and second hydraulic clutches 63 and 64 are changed over between engagement and disengagement by a clutch actuator 125, which is disposed on the clutch cover 56. In addition, an oil reservoir 126 for temporarily reserving oil is formed between the spacer plate 55 and the oil reserving tank 57. Oil from a first oil feed pump 127 which sucks up oil from the oil reservoir 126 is supplied to the clutch actuator 125 through a first oil filter 130. The clutch actuator 125 operates to carry out changeover between action and release of hydraulic pressure upon and from the first oil path 82 and the first axial oil path 80 communicating with the first hydraulic chamber 78 of the first hydraulic clutch 63 and further carry out changeover between action and release of hydraulic pressure upon and from the second oil path 83 and the second axial oil path 81 communicating with the second hydraulic chamber 79 of the second hydraulic clutch 64. The first and second hydraulic clutches 63 and 64 are changed over between engagement and disengagement by the changeover by the clutch actuator 125. Surplus oil from the first oil feed pump 127 is returned to the oil reservoir 126 through a first relief valve 133.

A second oil feed pump 128 is connected to the oil reservoir 126 commonly with a first oil feed pump 127. Oil from the second oil feed pump 128 is supplied to a plurality of lubricated portions 132 of the power unit P through a second oil filter 131, and surplus oil from the second oil feed pump 128 is returned to the oil reservoir 126 through a second relief valve 134.

The discharge capacity of the second oil feed pump 128 is set higher than that of the first oil feed pump 127. Accordingly, the second oil filter 131 is configured to be a greater size relative to the first oil filter 130.

Oil in the oil pan 59 is sucked up by a scavenge pump 129 through a strainer 135. Oil discharged from the scavenge pump 129 is supplied to the oil reservoir 126 through an oil cooler 136.

Figure 12:
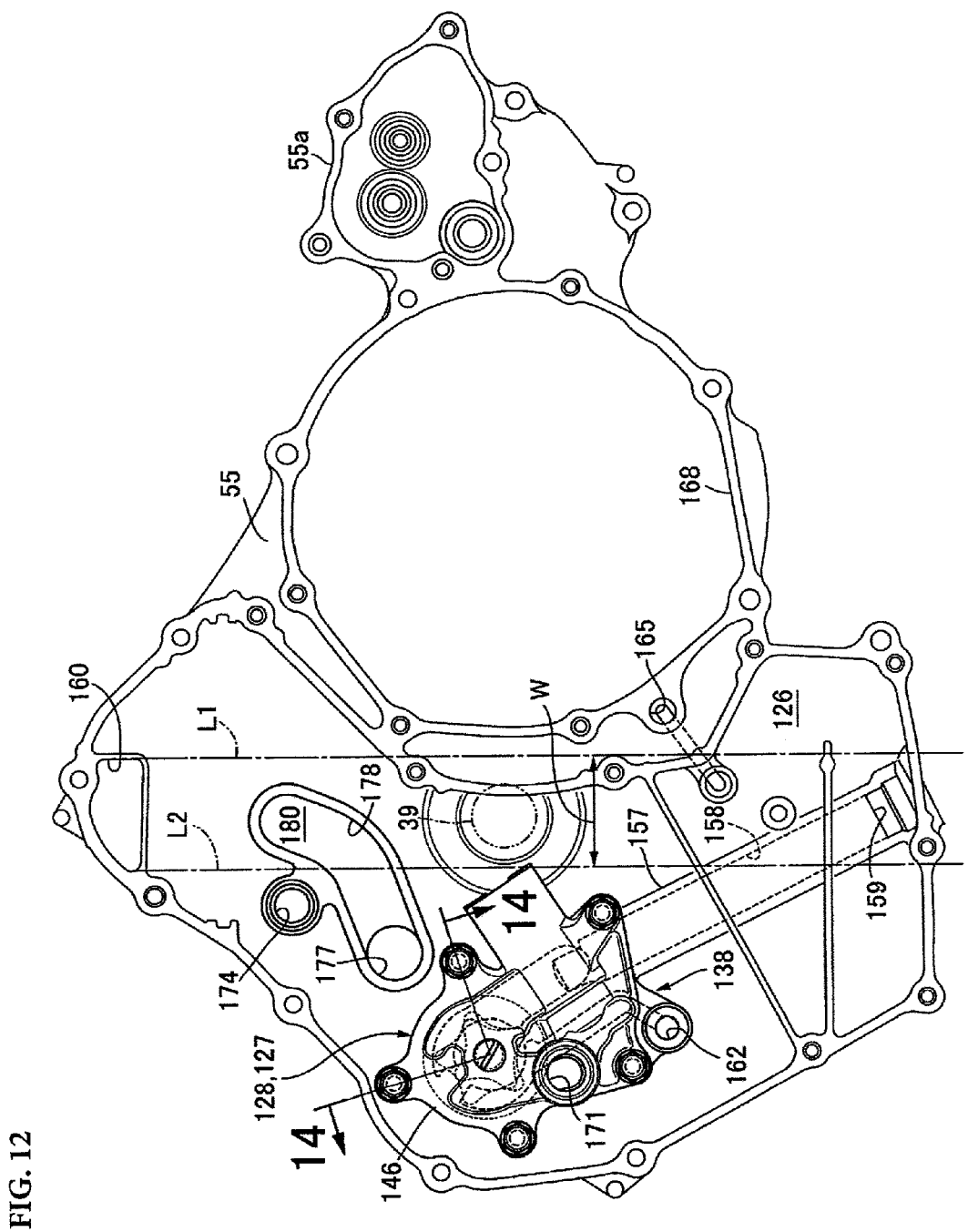
FIG. 12 is a view of a spacer plate as viewed in the same direction as that of FIG. 4.
Figure 13:
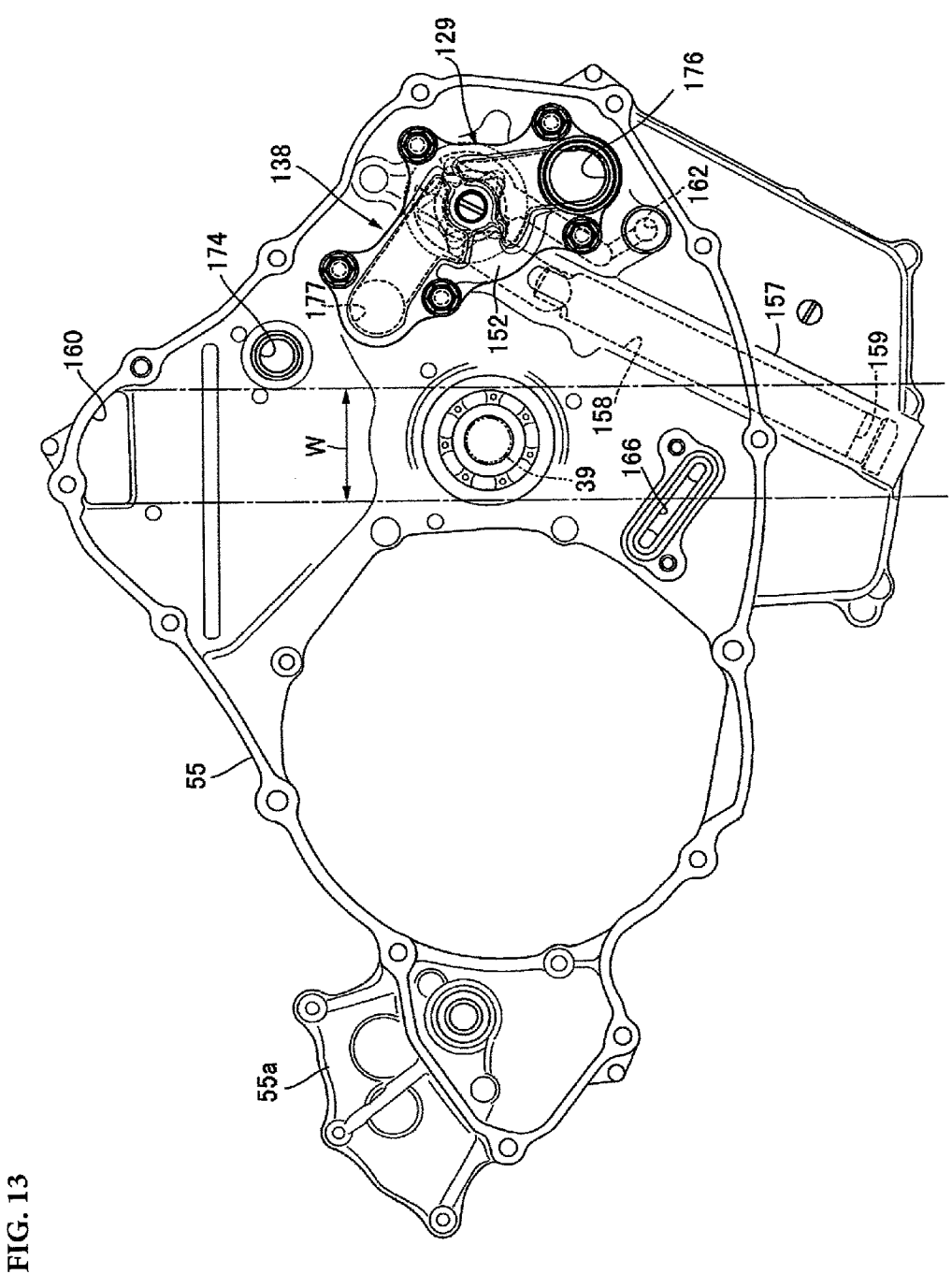
FIG. 13 is a view of the spacer plate as viewed from the opposite side to that of FIG. 12.
Figure 14:
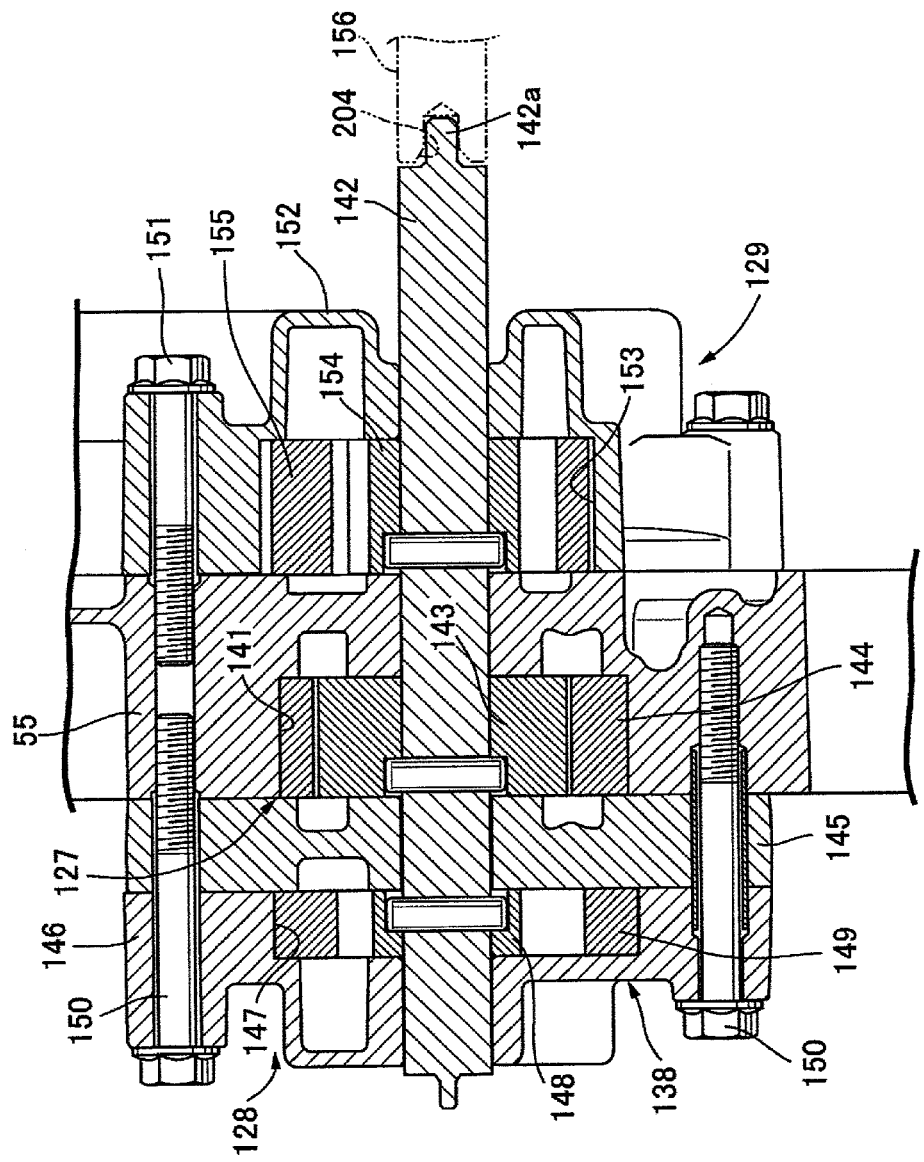
FIG. 14 is a sectional view taken along line 14-14 of FIG. 12.

Referring also to FIGS. 12 to 14, the first oil feed pump 127, second oil feed pump 128 and scavenge pump 129 are disposed on the spacer plate 55 so as to cooperate with each other to configure a pump unit 138.

Paying attention particularly to FIG. 14, the first oil feed pump 127 has a pump chamber 141 formed between the spacer plate 55 and a partition plate 140 fastened to one face of the spacer plate 55 on the oil reserving tank 57 side. The first oil feed pump 127 further has an inner rotor 143 and an outer rotor 144 accommodated in the pump chamber 141. The inner rotor 143 is fixed to an oil pump shaft 142 having an axial line parallel to the crankshaft 39, and the outer rotor 144 meshes with the inner rotor 143.

Meanwhile, the second oil feed pump 128 has a pump chamber 147 formed between a partition plate 145 and a pump cover 146, which cooperates with the spacer plate 55 to sandwich the partition plate 145 therebetween. The second oil feed pump 128 further has an inner rotor 148 and an outer rotor 149 accommodated in the pump chamber 147. The inner rotor 148 is fixed to the oil pump shaft 142, and the outer rotor 149 meshes with the inner rotor 148.

The partition plate 145 and the pump cover 146 are fastened to the spacer plate 55 by fastening by a plurality of bolts 150.

The scavenge pump 129 has a pump chamber 153 formed between the spacer plate 55 and a pump cover 152 fastened to the other face of the spacer plate 55 on the crankcase 52 by a plurality of bolts 151. The scavenge pump 129 further has an inner rotor 154 and an outer rotor 155 accommodated in the pump chamber 153. The inner rotor 154 is fixed to the oil pump shaft 142, and the outer rotor 155 meshes with the inner rotor 154.

The scavenge pump 129 extends through and is supported for rotation on the spacer plate 55, partition plate 145 and pump covers 146 and 152. A balancer shaft 156 is connected coaxially against relative rotation on the oil pump shaft 142 and rotates in an interlocking relationship with the crankshaft 39.

By such disposition of the pump unit 138 on the spacer plate 55, the first oil feed pump 127, second oil feed pump 128 and scavenge pump 129 are disposed in a juxtaposed relationship in a direction parallel to the axial line of the crankshaft 39.

The first oil feed pump 127 which discharges oil purified by the first oil filter 130 and the second oil feed pump 128 which discharges oil purified by the second oil filter 131 are disposed on one side of the spacer plate 55 (in the present embodiment, on the oil reserving tank 57 side). The scavenge pump 129 which is the other oil pump is disposed on the other side of the spacer plate 55 (in the present embodiment, on the crankcase 52 side). In the oil reserving tank 57, at least part of the second oil feed pump 128 which is an oil pump which discharges oil purified by the second oil filter 131 which is a large-size oil filter is disposed.

In addition, the pump unit 138 including the second oil feed pump 128 is disposed on the spacer plate 55 positioned closely to the oil reserving tank 57 to which the first and second oil filters 130 and 131 are attached in a direction along the axial line of the crankshaft 39. Therefore, the second oil filter 131 is disposed in the proximity of the second oil feed pump 128.

The first oil feed pump 127 and the second oil feed pump 128 suck in oil from the oil reservoir 126. An oil suction passage 158 is provided in the spacer plate 55 such that it is communicated commonly with the pump chamber 141 of the first oil feed pump 127 and the pump chamber 147 of the second oil feed pump 128.

The oil suction passage 158 is formed in a tubular portion 157 provided on the spacer plate 55 and extends in the upward and downward direction. A communication hole 159 is provided at a lower portion of the tubular portion 157. The communication hole 159 communicates the oil reservoir 126 with the oil suction passage 158.

An overflow passage 160 is provided at an upper portion of the spacer plate 55 and allows oil in the crankcase 52 to overflow from the oil reservoir 126. The overflow passage 160 and the oil suction passage 158 are disposed at a central location of the engine main body 38 in the left and right direction in such a manner that the overflow passage 160 overlaps with part of the oil suction passage 158 as viewed in a plan view in a state in which engine main body 38 is mounted on the vehicle. In particular, relative positions of the overflow passage 160 and the oil suction passage 158 are determined such that, on a projection view on a plane perpendicular to the axial line of the crankshaft 39, part of the oil suction passage 158 is disposed within a width W between a pair of vertical lines which pass the opposite ends of the overflow passage 160 in the left and right direction.

Figure 15:
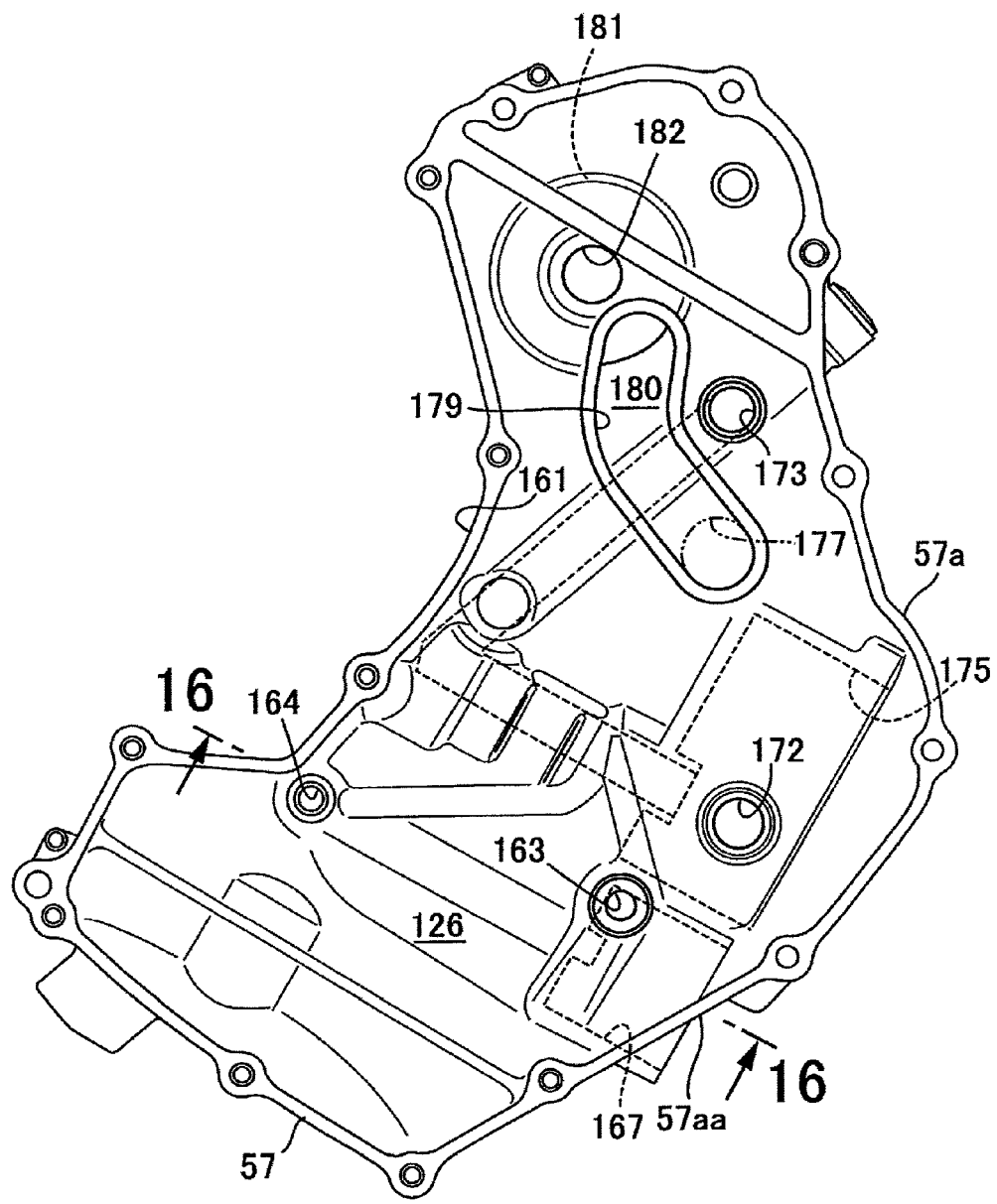
FIG. 15 is a view of a reservoir tank for oil as viewed from the spacer plate side.

Referring to FIG. 15, the oil reserving tank 57 is positioned adjacent the clutch cover 56 and has a recessed portion 161 which accommodates part of the clutch cover 56 therein. Further, the first oil filter 130 and the second oil filter 131 are attached in an upwardly and downwardly juxtaposed relationship with each other on an outer side wall 57a of the oil reserving tank 57 on the opposite side to the transmission 60 with respect to the crankshaft 39, namely, on the opposite side to the clutch cover 56.

A lower half of the outer side wall 57a of the oil reserving tank 57 is formed as an inclined wall portion 57aa inclined so as to be spaced away from the transmission 60 toward the upper side. The second oil filter 131 which is a large size oil filter is attached to an upper portion of the inclined wall portion 57aa while the first oil filter 130 which is a small size oil filter is attached to an intermediate portion of the inclined wall portion 57aa in the upward and downward direction.

Oil discharged from the first oil feed pump 127 is introduced into a first passage 162 (refer to FIGS. 12 and 13) provided in the spacer plate 55. With the first passage 162, a second passage 163 provided in the oil reserving tank 57 is communicated when the oil reserving tank 57 is coupled to the spacer plate 55. A bottomed first filter mounting hole 167 for attaching the first oil filter 130 is provided at an intermediate portion in the upward and downward direction of the inclined wall portion 57aa of the outer side wall 57a of the oil reserving tank 57. The second passage 163 is formed in the oil reserving tank 57 such that it is in communication with the first filter mounting hole 167.

Figure 16:
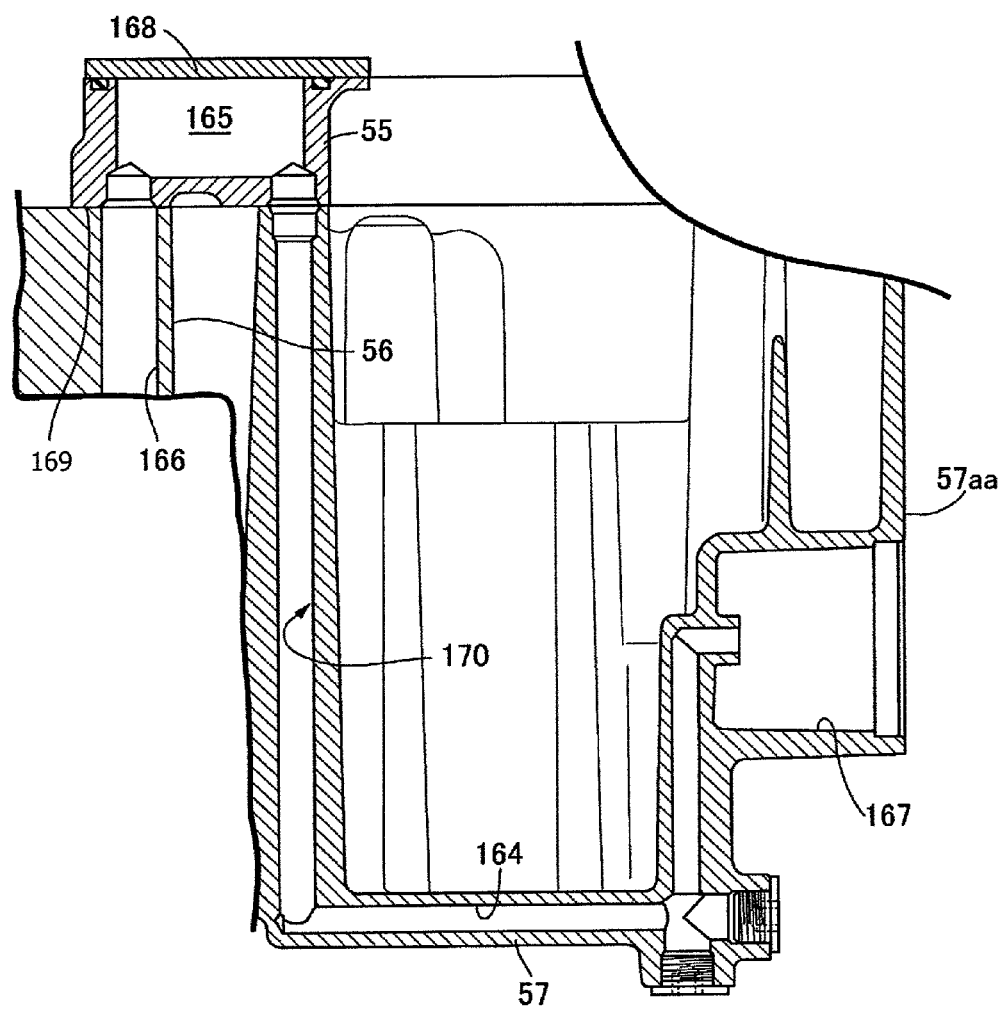
FIG. 16 is a sectional view taken along line 16-16 of FIG. 15.

Referring to FIG. 16, oil purified by the first oil filter 130 is introduced into a third passage 164. The third passage 164 is provided in the oil reserving tank 57 such that it is open at one end portion thereof coaxially to an inner end portion of the first filter mounting hole 167 and open at the other end portion thereof to a coupling face of the oil reserving tank 57 to the spacer plate 55. Meanwhile, an elongated hole is provided in the spacer plate 55 and has one end communicated with the other end portion of the third passage 164. A lid plate 168 is fastened to the spacer plate 55 for closing the opposite side of the elongated hole to the oil reserving tank 57 thereby to form a fourth passage 165, which has one end communicated with the other end of the third passage 164, in the spacer plate 55.

A clutch cover attachment seat 169 is formed on the spacer plate 55 and continues in an endless fashion to the spacer plate 55 for fastening the clutch cover 56. The fourth passage 165 is open at the other end thereof to the clutch cover attachment seat 169. A fifth passage 166 is provided in the clutch cover 56 and connects to the clutch actuator 125 such that it is communicated with the other end of the fourth passage 165.

The third to fifth passages 164 to 166 configure an oil passage 170 which supplies oil from the first oil filter 130 attached to the inclined wall portion 57aa at a lower portion of the oil reserving tank 57 to the first and second hydraulic clutches 63 and 64 side through the clutch actuator 125. The oil passage 170 is formed in the oil reserving tank 57, spacer plate 55 and clutch cover 56.

Oil discharged from the second oil feed pump 128 is introduced to a sixth passage 171 (refer to FIGS. 12 and 13) provided in the pump cover 146. With the sixth passage 171, a seventh passage 172 provided in the oil reserving tank 57 is in communication when the oil reserving tank 57 is coupled to the spacer plate 55. A bottomed second filter mounting hole 175 for attaching the second oil filter 131 is provided at an upper portion of the inclined wall portion 57aa of the outer side wall 57a of the oil reserving tank 57. The seventh passage 172 is formed in the oil reserving tank 57 in a communicating relationship with the second filter mounting hole 175.

Oil purified by the second oil filter 131 is introduced into an eighth passage 173 provided in the oil reserving tank 57. The oil reserving tank 57 is coaxially open at one end portion thereof to an inner end portion of the second filter mounting hole 175 and is open at the other end portion thereof to the spacer plate 55 side. Meanwhile, a ninth passage 174 is provided in the spacer plate 55 so as to communicate at one end thereof with the other end of the eighth passage 173. The ninth passage 174 is communicated with an oil path (not depicted) provided in the crankcase 52. The oil path is in communication with the lubricated portions 132 when the spacer plate 55 is coupled to the crankcase 52.

A suction hole 176 is provided in the pump cover 152 provided in the scavenge pump 129 so as to suck up oil from within the oil pan 59. A tenth passage 177 is provided in the spacer plate 55 such that it is in communication at one end thereof with the pump chamber 153 so that it introduces oil discharged from the scavenge pump 129. A passage forming recessed portion 178 is provided in the spacer plate 55 and is open to the oil reserving tank 57 side. The passage forming recessed portion 178 extends in the upward and downward direction with an intermediate portion thereof in the upward and downward direction curved and is closed up at the opposite upper and lower end portions. The tenth passage 177 is open at the other end thereof to a lower portion of the passage forming recessed portion 178. Meanwhile, a passage forming recessed portion 179 is provided in the oil reserving tank 57 in such a manner so as to have a shape corresponding to the passage forming recessed portion 178 and cooperates with the passage forming recessed portion 178 to configure an eleventh passage 180.

The eleventh passage 180 has an upper end portion open to an outer peripheral portion of an oil cooler attachment seat 181 in order to attach the oil cooler 136 disposed above the second oil filter 131 thereto. The oil cooler attachment seat 181 is formed on an outer face of an upper portion of the oil reserving tank 57 which faces rearwardly of the vehicle. A twelfth passage 182 is provided in the oil reserving tank 57 and is open at one end portion thereof to a central portion of the oil cooler attachment seat 181 and open at the other end portion thereof to an upper portion of the oil reservoir 126 formed between the oil reserving tank 57 and the spacer plate 55. In particular, oil discharged from the scavenge pump 129 is introduced into the oil cooler 136 through the tenth passage 177 and the eleventh passage 180, and the oil cooled by the oil cooler 136 is supplied to the oil reservoir 126 through the twelfth passage 182.

Figure 17:
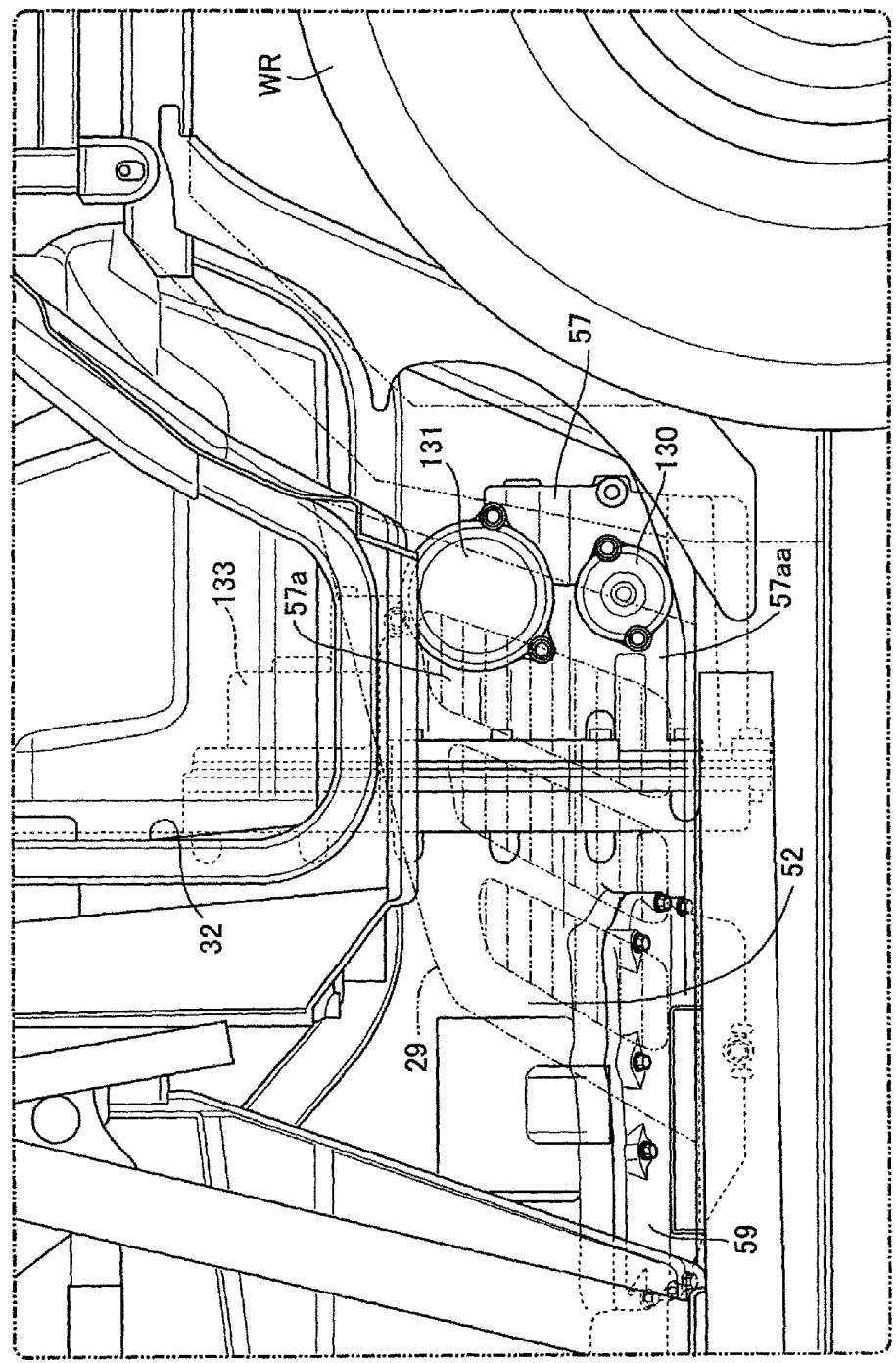
FIG. 17 is a side elevational view of part of a rear portion of the four-wheel drive vehicle for wasteland traveling as viewed from the left side in a state in which rear side covers and a rear door are omitted.

In addition, in a state in which the power unit P is mounted on the vehicle, the first and second oil filters 130 and 131 attached to the left side outer side wall 57a of the oil reserving tank 57 are disposed at positions corresponding to the left side rear side cover 30. As depicted in FIG. 17, in a state in which the left side rear side cover 30 is removed, the first and second oil filters 130 and 131 can be visually observed from the outside. Thus, maintenance work with respect to the first and second oil filters 130 and 131 is facilitated.

Figure 18:
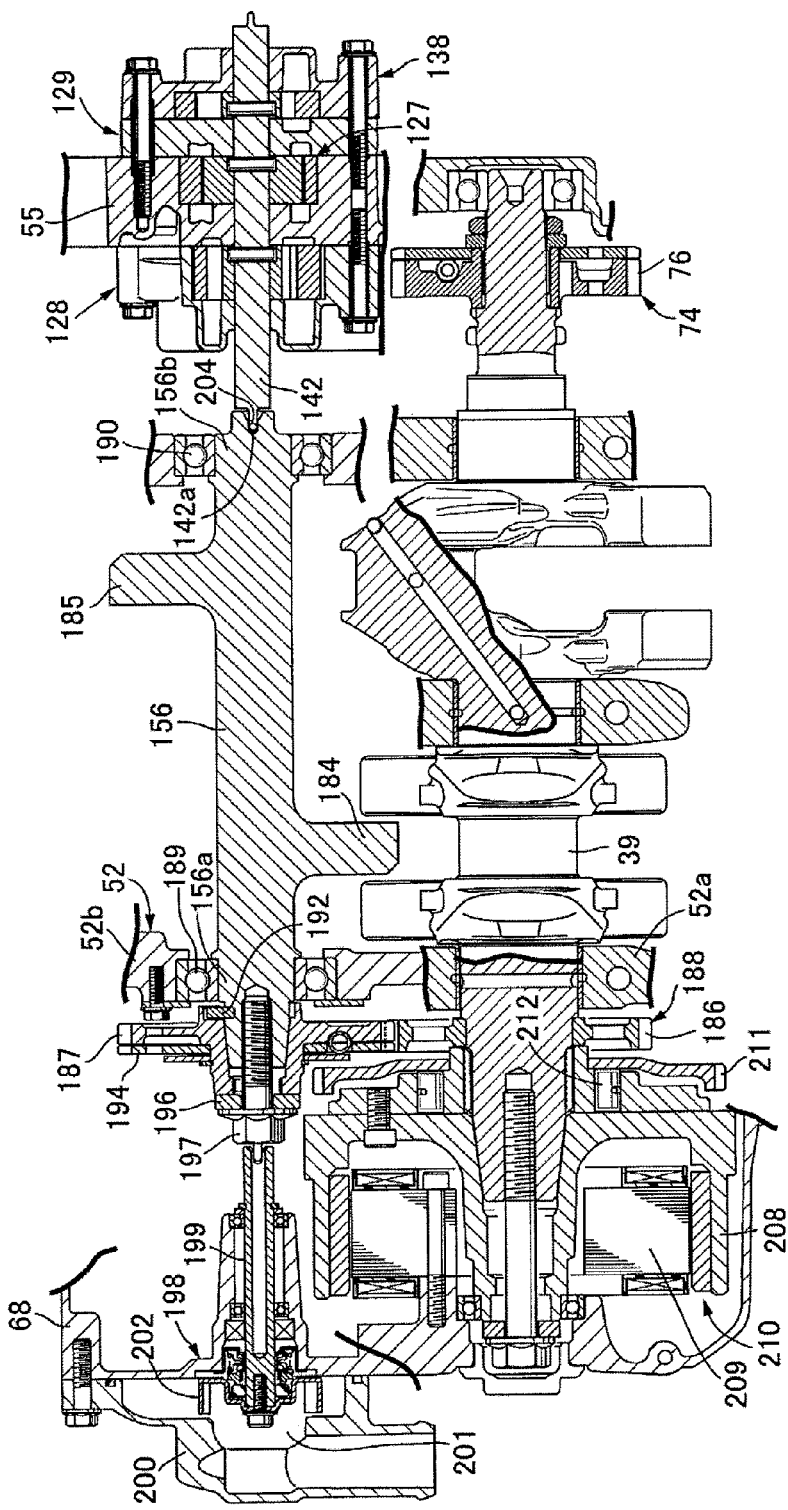
FIG. 18 is a sectional view taken along line 18-18 of FIG. 4.

Referring to FIG. 18, the crankshaft 39 and the balancer shaft 156, which is disposed coaxially with the oil pump shaft 142 of the pump unit 138 on the left side with respect to the crankshaft 39, are supported for rotation on the crankcase 52 of the engine main body 38. Between the crankshaft 39 and the balancer shaft 156, which has balance weights 184 and 185 for each cylinder of the two-cylinder internal combustion engine E and has an axial line parallel to the crankshaft 39, a gear transmission mechanism 188 is provided. The gear transmission mechanism 188 includes a driving gear wheel 186 fixed to the crankshaft 39 and a driven gear wheel 187 fixed to the balancer shaft 156.

An outer rotor 208 is fixed to a projecting end portion of the crankshaft 39 which projects forwardly from the crankcase 52. An inner stay 209 is fixed to the second case member 68, which configures part of the auxiliary transmission case 58, and cooperates with the outer rotor 208 to configure a generator 210. A starting driven gear wheel 211 is connected to the outer rotor 208 through a one-way clutch 212, and rotational power is inputted to the starting driven gear wheel 211 from a starter motor not depicted. The gear transmission mechanism 188 is provided between the crankshaft 39 and the balancer shaft 156 so as to be disposed between the crankcase 52 and the starting driven gear wheel 211.

Figure 19:
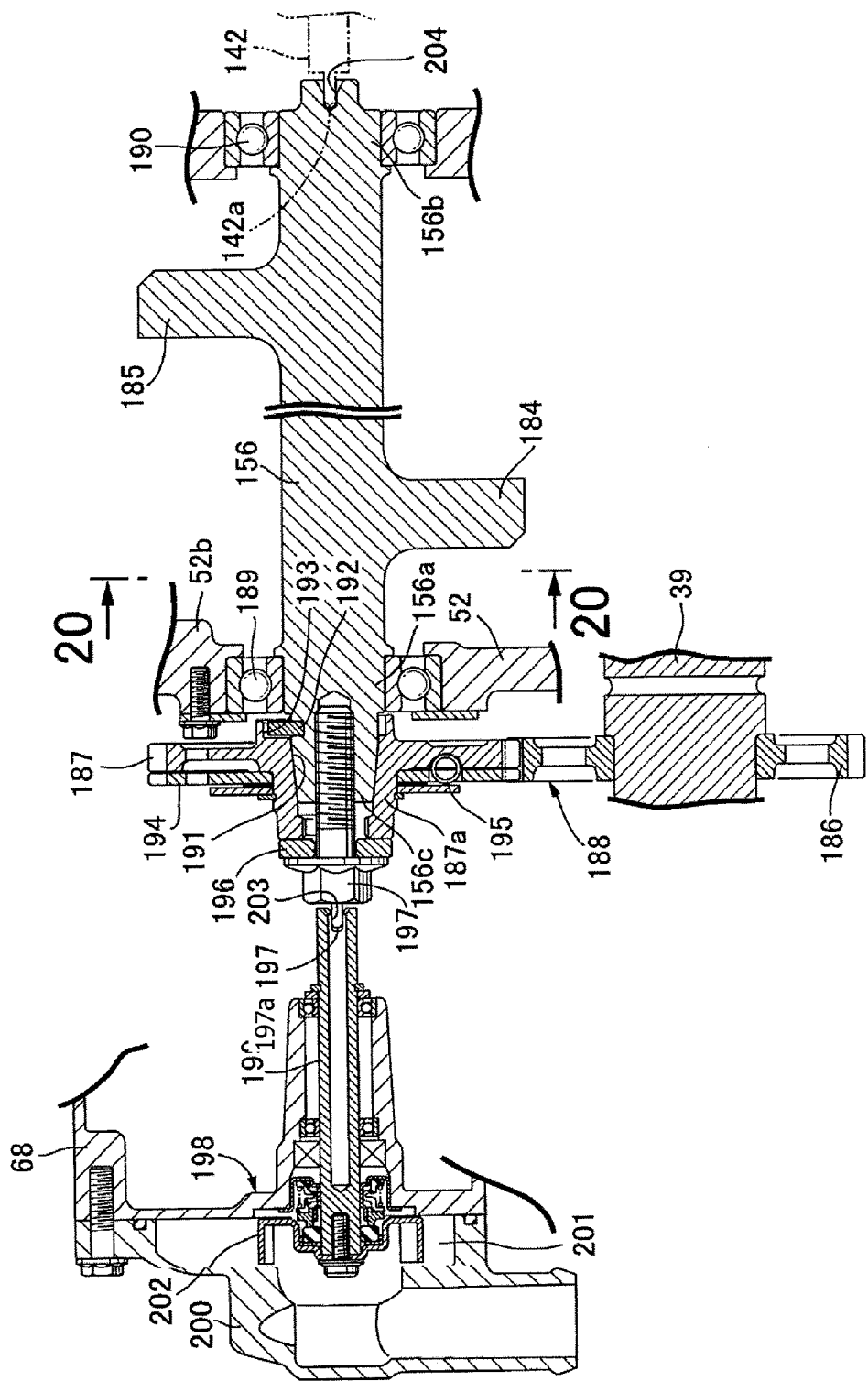
FIG. 19 is an enlarged view of major part of FIG. 18.

Referring also to FIG. 19, the balancer shaft 156 is formed so as to have a pair bearing portions 156a and 156b and a gear wheel supporting portion 156c. The bearing portions 156a and 156b are supported for rotation on the crankcase 52 through ball bearings 189 and 190, respectively. The gear wheel supporting portion 156c is connected to one 156a of the bearing portions 156a and 156b and disposed on the outer side of the crankcase 52. The gear wheel supporting portion 156c is formed in a tapering relationship such that the diameter thereof decreases away from the bearing portion 156a.

A tubular boss portion 187a is provided integrally on the driven gear wheel 187 and has an tapering attachment hole 191 in which the gear wheel supporting portion 156c is fitted. A fitting recessed portion 193 is provided on the boss portion 187a on the large diameter end side of the attachment hole 191 such that it has an axial line along a radial direction of the balancer shaft 156. A pin 192 is fitted at a half portion on one end side thereof with a large diameter end of the gear wheel supporting portion 156c and is fitted at a half portion on the other end side thereof with the fitting recessed portion 193.

A sub gear wheel 194 for cooperating with the driven gear wheel 187 to absorb a backlash is mounted on the boss portion 187a on the small diameter end side of the attachment hole 191 with a spring 195 as a biasing member interposed between the sub gear wheel 194 and the driven gear wheel 187.

Figure 20:
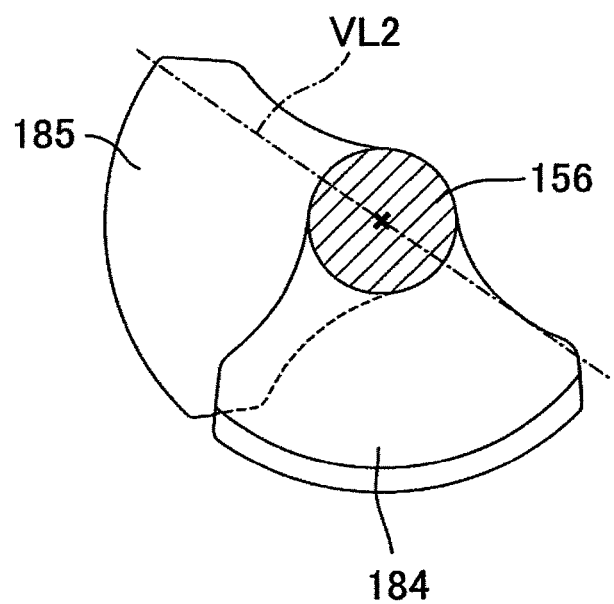
FIG. 20 is a sectional view taken along line 20-20 of FIG. 19.

Referring to FIG. 20, the balance weights 184 and 185 are provided on the balancer shaft 156 in such a manner that they are concentrated upon one portion of a plane VL2 including the axial line of the balancer shaft 156. The fitting position of the pin 192 with the gear wheel supporting portion 156c is determined such that the pin 192 is directed upwardly in a phase of rotation of the balance weights 184 and 185 determined by the self-weight of the balance weights 184 and 185 in a natural state in which the axial line of the balancer shaft 156 extends horizontally.

A bolt 197 is screwed in the gear wheel supporting portion 156c such that it cooperates with an end portion of the boss portion 187a on the opposite side to the crankcase 52 to sandwich a pressing plate 196 therebetween. By the provision of the bolt 197, an end portion of the boss portion 187a is pressed in a direction in which the gear wheel supporting portion 156c is fitted into the attachment hole 191. Thus, the driven gear wheel 187 is fixed to the gear wheel supporting portion 156c by the pin 192 and the bolt 197.

In addition, when the gear transmission mechanism 188 is to be assembled by placing the driving gear wheel 186 of the crankshaft 39 into meshing engagement with the driven gear wheel 187 and the sub gear wheel 194 in a state in which the coupling face of the lower case member 52b to the upper case portion 52a and lies horizontally so as to face upwardly in a state in which the balancer shaft 156 in a state in which the driven gear wheel 187 and the sub gear wheel 194 are assembled thereto is sub-assembled to the lower case member 52b of the crankcase 52, the assembly is carried out such that alignment marks provided on a side face of the sub gear wheel 194 and the driving gear wheel 186 are aligned with each other.

Referring to FIG. 19, the bolt 197 of the balancer shaft 156 on which the balance weights 184 and 185 are provided has an engaging portion 197a provided thereon for engagement against relative rotation with a water pump shaft 199 as a rotary shaft provided on a water pump 198 which is a first auxiliary apparatus.

The water pump 198 includes an impeller 202 fixed to the water pump shaft 199 and accommodated in a pump chamber 201. The pump chamber 201 is formed between the second case member 68 which configures part of the auxiliary transmission case 58 and a pump cover 200 fastened to the second case member 68.

The engaging portion 197a of the bolt 197 extends along a diametrical line of the bolt 197 and projects to the water pump shaft 199 side. The engaging portion 197a is engaged with a locking recessed portion 203 provided at an end portion of the water pump shaft 199 on the bolt 197 side to connect the bolt 197 fixed to the balancer shaft 156 coaxially against relative rotation to the water pump shaft 199.

The oil pump shaft 142 of the pump unit 138 which is a second auxiliary apparatus is connected coaxially against relative rotation to an end portion of the balancer shaft 156 on the opposite side to the gear wheel supporting portion 156c. In particular, at an end portion of the balancer shaft 156 on the opposite side to the gear wheel supporting portion 156c, a locking recessed portion 204 is formed such that it extends along a diametrical line of the balancer shaft 156. An engaging portion 142a is provided in projecting manner at an end portion of the oil pump shaft 142 on the balancer shaft 156 side and is engaged with the locking recessed portion 204.

The operation of the present embodiment is described as follows. The crankshaft 39 and the balancer shaft 156 which is disposed on the left side with respect to the crankshaft 39 are supported for rotation on the crankcase 52 of the engine main body 38. The balancer shaft 156 having the balance weights 184 and 185 provided thereon for each cylinder and having an axial line parallel to the crankshaft 39 is formed such that it has the pair of bearing portions 156a and 156b supported for rotation on the crankcase 52 and the gear wheel supporting portion 156c disposed on the outer side of the crankcase 52 continuously to one 156a of the bearing portions 156a and 156b and formed in such a tapering relationship that the diameter thereof decreases away from the bearing portion 156a. On the driven gear wheel 187 which configures part of the gear transmission mechanism 188 provided between the crankshaft 39 and the balancer shaft 156, the tubular boss portion 187a having the tapering attachment hole 191 in which the gear wheel supporting portion 156c is fitted is provided integrally. The fitting recessed portion 193 in which the pin 192 which has an axial line along a radial direction of the balancer shaft 156 and is fitted at a half portion thereof on one end side with a large diameter end of the gear wheel supporting portion 156c is fitted at a half portion thereof on the opposite end side is provided on the boss portion 187a on the large diameter end side of the attachment hole 191.

Accordingly, relative positions of the balancer shaft 156 and the driven gear wheel 187 around the axial line are determined by a structure which does not include a keyway. Thus, while the continuity of the tapering faces of the outer circumference of the gear wheel supporting portion 156c and the inner circumference of the attachment hole 191 is achieved, the productivity is improved. Further, positioning of the driven gear wheel 187 around the axial line of the boss portion 187a and the gear wheel supporting portion 156c can be achieved firmly. Consequently, an increase in the transmission torque can be anticipated while upsizing of the balancer shaft 156 is prevented.

Further, the sub gear wheel 194 which cooperates with the driven gear wheel 187 to absorb a backlash is mounted on the boss portion 187a on the small diameter end side of the attachment hole 191 with the spring 195 interposed between the sub gear wheel 194 and the driven gear wheel 187. Therefore, there is no possibility of interference of the sub gear wheel 194 with the portion which plays a role for positioning the driven gear wheel 187 and the balancer shaft 156c. Consequently, a degree of freedom in the shape of the sub gear wheel 194 can be assured and the assembling property can be enhanced.

Further, the balance weights 184 and 185 are provided on the balancer shaft 156 in a concentrated manner at a portion of the plane VL2 including the axial line of the balancer shaft 156. Further, the fitting position of the pin 192 with the gear wheel supporting portion 156c is determined such that the pin 192 is directed upwardly in a phase of rotation which depends upon the self-weight of the balance weights 184 and 185 in a natural state in which the axial line of the balancer shaft 156 extends horizontally. Therefore, when the boss portion 187a of the driven gear wheel 187 is assembled to the gear wheel supporting portion 156c of a tapering shape, even if the pin 192 is provided at a position on the rear face side of the driven gear wheel 187, phase adjustment of the balancer shaft 156 to the driven gear wheel 187, and hence, phase adjustment of the balancer shaft 156 to the crankshaft 39, is facilitated. Thus, the assembling property is improved.

Further, the engaging portion 197a for engaging against relative rotation with the water pump shaft 199 provided on the water pump 198 is provided on the bolt 197 which is screwed in the gear wheel supporting portion 156c in such a manner so as to press the end face of the boss portion 187a on the side on which the gear wheel supporting portion 156c is fitted in the attachment hole 191. Therefore, a reduction in the size of the balancer shaft 156 can be maintained even against an increase of the load which is to act upon the balancer shaft 156 from the water pump 198.

Further, since the pump unit 138 is connected coaxially against relative rotation at an end portion of the balancer shaft 156 on the opposite side to the gear wheel supporting portion 156c, even if the load to act upon the balancer shaft 156 increases, a reduction in the size of the balancer shaft 156 can be maintained.

Further, the first main shaft 69, second main shaft 70 and countershaft 71 which extend in parallel to the crankshaft 39 and configure part of the transmission 60 for changing the speed of the rotational power from the crankshaft 39 are disposed on the right side with respect to the crankshaft 39. Further, the oil reserving tank 57 is coupled to the crankcase 52 on one end side of the crankshaft 39 in the axial direction, and the first and second oil filters 130 and 131 are attached to the outer side wall 57a of the oil reserving tank 57 on the opposite side to the transmission 60 with respect to the crankshaft 39 such that they are disposed in an upwardly and downwardly juxtaposed relationship with each other. Therefore, the first and second oil filters 130 and 131 can be accessed from the same direction (in the embodiment, from the left side of the vehicle), and consequently, the maintenance property can be enhanced.

Further, the oil reserving tank 57 which cooperates with the spacer plate 55 coupled to the crankcase 52 to form therebetween the oil reservoir 126 for temporarily reserving oil therein is coupled to the crankcase 52 with the spacer plate 55 interposed therebetween. A lower half portion of the outer side wall 57a of the oil reserving tank 57 is formed as the inclined wall portion 57aa which is inclined such that the space from the transmission 60 increases toward the upper side, and the second oil filter 131 of a large size is attached to an upper portion of the inclined wall portion 57aa while the first oil filter 130 of a small size is attached to an intermediate portion of the inclined wall portion 57aa in the upward and downward direction. Therefore, by forming the first oil filter 130 disposed in the proximity of the road surface in a state in which the engine main body 38 is mounted on the vehicle as a small size filter, both the assurance of the capacity of the oil reservoir 126 through suppression of swelling from a lower portion of the oil reserving tank 57 and the assurance of the protection performance by a decrease of the area of the element positioned in the proximity of the road surface can be achieved. As a result, the mounting property of the internal combustion engine E on the vehicle can be enhanced.

Further, at least part of the second oil feed pump 128 which discharges oil purified by the second oil filter 131 of a large size is disposed in the oil reserving tank 57, and the second oil filter 131 is disposed adjacent the second oil feed pump 128 in a direction along the axial line of the crankshaft 39. Therefore, the oil passage from the second oil feed pump 128 to the second oil filter 131 can be formed in a reduced length.

Further, the first oil feed pump 127 which discharges oil purified by the first oil filter 130 and the second oil feed pump 128 which discharges oil purified by the second oil filter 131 are disposed on one side of the spacer plate 55 while the scavenge pump 129 which is a different oil pump is disposed on the other side of the spacer plate 55. Further, the first oil feed pump 127, second oil feed pump 128 and scavenge pump 129 are disposed in a juxtaposed relationship with one another in a direction parallel to the axial line of the crankshaft 39. Therefore, the oil passage from the first oil feed pump 127 to the first oil filter 130 and the oil path from the second oil feed pump 128 to the second oil filter 131 can be formed in a reduced length.

Further, the oil suction passage 158 common to the pump chambers 141 and 147 provided in the first and second oil feed pumps 127 and 128 into which oil is sucked from the oil reservoir 126 is provided in the spacer plate 55 in a communicating relationship with the oil reservoir 126. Therefore, a reduction in the size by common use of the oil suction passage 158 can be achieved.

Further, the overflow passage 160 which allows oil to overflow from the oil reservoir 126 into the crankcase 52 is provided at an upper portion of the spacer plate 55. Further, the overflow passage 160 and the oil suction passage 158 are disposed at a central portion of the engine main body 38 in the leftward and rightward direction in such a manner that the overflow passage 160 overlaps with part of the oil suction passage 158 as viewed in a plan view in a state in which the engine main body 38 is mounted on the vehicle. Therefore, the left-right difference by fluidity of the oil in the oil reservoir 126 in terms the oil sucking performance of the first and second oil feed pumps 127 and 128 and the oil discharging performance from the oil reservoir 126 can be equalized. Thus, the dispersion by leftward and rightward tilting of the vehicle body can be reduced.

Further, the clutch cover 56 which covers the first and second hydraulic clutches 63 and 64 interposed between the crankshaft 39 and the transmission 60 is coupled to the spacer plate 55 on one end portion side of the crankshaft 39 in the axial direction. Meanwhile, the oil reserving tank 57 has the recessed portion 161 for accommodating part of the clutch cover 56 and is disposed adjacent the clutch cover 56. Therefore, the distance of the outer side wall 57a positioned on the opposite side to the transmission 60 with respect to the crankshaft 39 from among the outer side walls of the oil reserving tank 57 of the clutch cover 56 from the crankshaft 39 can be made short thereby to prevent upsizing of the engine main body 38. In addition, the oil passage 170 for supplying oil from the first oil filter 130 attached to a lower portion of the oil reserving tank 57 to the first and second hydraulic clutches 63 and 64 side is formed in the oil reserving tank 57, spacer plate 55 and clutch cover 56. Therefore, reduction in length of the oil passage 170 can be anticipated.

Further, the transmission 60 includes the first and second main shafts 69 and 70 which have an axial line parallel to the driving force output power shaft 87 and are disposed at a position offset in the axial direction from the driving force output power shaft 87. Further, the crankcase 52 for supporting the first and second main shafts 69 and 70 for rotation and the auxiliary transmission case 58 having the output power shaft supporting portion 110 for supporting the driving force output power shaft 87 for rotation are disposed adjacent each other such that the output power shaft supporting portion 110 projects to the right side from the crankcase 52. Further, the breather chamber 115 disposed above the projection from the output power shaft supporting portion 110 at least at one end portion (in the embodiment, at a rear end portion) of the driving force output power shaft 87 is formed between the first and second case members 67 and 68 which cooperate with each other to configure the auxiliary transmission case 58. Therefore, the coupling portions of the first and second case members 67 and 68 can be reinforced by formation of the breather chamber 115, and reduction in weight by function aggregation of the auxiliary transmission case 58 can be anticipated. In addition, since the breather chamber 115 is disposed above the projection from the output power shaft supporting portion 110 at a rear end portion of the driving force output power shaft 87, a foreign article dropping from above can be prevented from entering the oil seal 112 side provided between the rear end portion of the driving force output power shaft 87 and the output power shaft supporting portion 110. Consequently, protection of the oil seal 112 can be anticipated.

Further, the first case member 67 has the side wall 67a which faces in the projection direction of the output power shaft supporting portion 110 from the crankcase 52, namely, in the rightward direction. The first case member 67 further has the projection 67b which is provided integrally in a projecting manner so as to project to the right side from the side wall 67a and cooperates with the second case member 68 to configure the output power shaft supporting portion 110. Further, the swollen portion 116 which is swollen to the opposite side to the second case member 68 so as to form part of the breather chamber 115 is provided integrally on the projection 67b in an integrally continuing relationship to the side wall 67a. Therefore, the continuing portion of the projection 67b to the side wall 67a can be reinforced by the swollen portion 116.

Further, the first and second case members 67 and 68 are coupled to each other such that they can be separated in the axil line direction of the driving force output power shaft 87. Further, the cylindrical portion 68b extending in the axial direction of the driving force output power shaft 87 is formed integrally on the second case member 68 in such a manner so as to cover the driving force output power shaft 87 from a side. Further, the first case member 67 is coupled to the crankcase 52 of the engine main body 38 of the internal combustion engine E. Therefore, the portion of the auxiliary transmission case 58 which projects sidewardly farther than the crankcase 52 so as to support the driving force output power shaft 87 is structured independently of the engine main body 38 thereby to achieve stabilization of the oil face in the output power shaft supporting portion 110 of the auxiliary transmission case 58 which supports the driving force output power shaft 87. In addition, since the auxiliary transmission case 58 independent of the engine main body 38 is reinforced by formation of the breather chamber 115, while the auxiliary transmission case 58 is reinforced, the driving force output power shaft 87 can be disposed at a position spaced from the engine main body 38.

Further, the partition walls 119 and 120 for forming the flow path in the breather chamber 115 as a labyrinth flow path are provided integrally in a projecting manner on the first and second case members 67 and 68, respectively. Therefore, the breather chamber 115 can be reinforced by the plural partition walls 119 and 120 thereby to further raise the reinforcing effect by the breather chamber 115 of the auxiliary transmission case 58.

Further, the crankcase 52 of the power unit P is mounted at a central location in the forward and rearward direction of the four-wheeled vehicle in a posture in which the crankshaft 39 supported for rotation on the crankcase 52 is directed in the forward and rearward direction of the vehicle and the driving force output power shaft 87 is directed in the forward and rearward direction of the vehicle such that it is connected to the propeller shafts 65 and 66 which pass along the side of the crankcase 52. Therefore, downsizing and disassembly and assembly of the crankcase 52 are facilitated.

Furthermore, the four-wheeled vehicle is a four-wheel drive vehicle wherein the front wheels WF and the rear wheels WR are driven, and the driving force output power shaft 87 is connected at the opposite end portions thereof to the front and rear wheel propeller shafts 65 and 66 which pass along the side of the crankcase 52. Therefore, reactive force acting upon the power unit P from the front and rear wheel propeller shafts 65 and 66 can be reduced and vibrations of the power unit P can be reduced.

While the embodiment of the present invention has been described, the present invention is not limited to the embodiment described above, but allows various design changes without departing from the spirit of the present invention described in the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A balancer apparatus for an internal combustion engine wherein a gear transmission mechanism is positioned between a crankshaft supported for rotation on a crankcase forming part of an engine main body and a balancer shaft which has balance weights thereon and is supported for rotation on the crankcase so as to have an axial line parallel to the crankshaft, comprising:
   a driven gear wheel fixed to the balancer shaft;
   said balancer shaft is formed so as to have a pair of bearing portions supported for rotation on the crankcase and a gear wheel supporting portion disposed on the outer side of the crankcase in a continuing relationship to one of the bearing portions and formed in a tapering shape such that a diameter thereof decreases away from the one bearing portion;
   a tubular boss portion is provided integrally on the driven gear wheel and has a tapering attachment hole in which the gear wheel supporting portion is fitted; and
   a fitting recessed portion in which a pin having an axial line along a radial direction of the balancer shaft and is fitted at a half portion on one end side thereof in a large diameter end portion of the gear wheel supporting portion is fitted at a half portion on the other end side thereof is provided on the boss portion on the large diameter end side of the attachment hole.

2. The balancer apparatus for an internal combustion engine according to claim 1, wherein a sub gear wheel for cooperating with the driven gear wheel to absorb a backlash is mounted on the boss portion on the smaller diameter end side of the attachment hole with an elastic member interposed between the sub gear wheel and the driven bear wheel.

3. The balancer apparatus for an internal combustion engine according to claim 1, wherein the balance weights are provided on the balancer shaft in a concentrated manner at one portion of a plane which includes an axial line of the balancer shaft, and the fitting position of the pin in the gear wheel supporting portion is determined such that the pin is directed upwardly in a phase of rotation which depends upon a self-weight of the balance weights in a natural state in which the axial line of the balancer shaft lies horizontally.

4. The balancer apparatus for an internal combustion engine according to claim 2, wherein the balance weights are provided on the balancer shaft in a concentrated manner at one portion of a plane which includes an axial line of the balancer shaft, and the fitting position of the pin in the gear wheel supporting portion is determined such that the pin is directed upwardly in a phase of rotation which depends upon a self-weight of the balance weights in a natural state in which the axial line of the balancer shaft lies horizontally.

5. The balancer apparatus for an internal combustion engine according to claim 1, wherein a fastening member which is screwed in the gear wheel supporting portion so as to press an end face of the boss portion in a direction in which the gear wheel supporting portion is fitted into the attachment hole has provided thereon an engaging portion with which a rotary shaft provided in a first auxiliary apparatus is fitted against relative rotation.

6. The balancer apparatus for an internal combustion engine according to claim 2, wherein a fastening member which is screwed in the gear wheel supporting portion so as to press an end face of the boss portion in a direction in which the gear wheel supporting portion is fitted into the attachment hole has provided thereon an engaging portion with which a rotary shaft provided in a first auxiliary apparatus is fitted against relative rotation.

7. The balancer apparatus for an internal combustion engine according to claim 3, wherein a fastening member which is screwed in the gear wheel supporting portion so as to press an end face of the boss portion in a direction in which the gear wheel supporting portion is fitted into the attachment hole has provided thereon an engaging portion with which a rotary shaft provided in a first auxiliary apparatus is fitted against relative rotation.

8. The balancer apparatus for an internal combustion engine according to claim 5, wherein a second auxiliary apparatus is coaxially connected against relative rotation to an end portion of the balancer shaft on the opposite side to the gear wheel supporting portion.

9. The balancer apparatus for an internal combustion engine according to claim 6, wherein a second auxiliary apparatus is coaxially connected against relative rotation to an end portion of the balancer shaft on the opposite side to the gear wheel supporting portion.

10. The balancer apparatus for an internal combustion engine according to claim 7, wherein a second auxiliary apparatus is coaxially connected against relative rotation to an end portion of the balancer shaft on the opposite side to the gear wheel supporting portion.

11. A balancer apparatus for an internal combustion engine comprising:
   a crankcase forming part of an engine main body;
   a crankshaft supported for rotation on a crankcase;
   a balancer shaft including balance weights thereon, said balancer shaft being supported for rotation on the crankcase so as to have an axial line parallel to the crankshaft;
   a gear transmission mechanism operatively positioned between the crankshaft and the balancer shaft;
   a driven gear wheel fixed to the balancer shaft;
   said balancer shaft including a pair of bearing portions supported for rotation on the crankcase and a gear wheel supporting portion disposed on the outer side of the crankcase in a continuing relationship to one of the bearing portions and formed in a tapering shape such that a diameter thereof decreases away from the one bearing portion;
   a tubular boss portion integrally provided on the driven gear wheel and including a tapering attachment hole in which the gear wheel supporting portion is fitted; and
   a fitting recessed portion in which a pin having an axial line along a radial direction of the balancer shaft and is fitted at a half portion on one end side thereof in a large diameter end portion of the gear wheel supporting portion is fitted at a half portion on the other end side thereof is provided on the boss portion on the large diameter end side of the attachment hole.

12. The balancer apparatus for an internal combustion engine according to claim 11, wherein a sub gear wheel for cooperating with the driven gear wheel to absorb a backlash is mounted on the boss portion on the smaller diameter end side of the attachment hole with an elastic member interposed between the sub gear wheel and the driven bear wheel.

13. The balancer apparatus for an internal combustion engine according to claim 11, wherein the balance weights are provided on the balancer shaft in a concentrated manner at one portion of a plane which includes an axial line of the balancer shaft, and the fitting position of the pin in the gear wheel supporting portion is determined such that the pin is directed upwardly in a phase of rotation which depends upon a self-weight of the balance weights in a natural state in which the axial line of the balancer shaft lies horizontally.

14. The balancer apparatus for an internal combustion engine according to claim 12, wherein the balance weights are provided on the balancer shaft in a concentrated manner at one portion of a plane which includes an axial line of the balancer shaft, and the fitting position of the pin in the gear wheel supporting portion is determined such that the pin is directed upwardly in a phase of rotation which depends upon a self-weight of the balance weights in a natural state in which the axial line of the balancer shaft lies horizontally.

15. The balancer apparatus for an internal combustion engine according to claim 11, wherein a fastening member which is screwed in the gear wheel supporting portion so as to press an end face of the boss portion in a direction in which the gear wheel supporting portion is fitted into the attachment hole has provided thereon an engaging portion with which a rotary shaft provided in a first auxiliary apparatus is fitted against relative rotation.

16. The balancer apparatus for an internal combustion engine according to claim 12, wherein a fastening member which is screwed in the gear wheel supporting portion so as to press an end face of the boss portion in a direction in which the gear wheel supporting portion is fitted into the attachment hole has provided thereon an engaging portion with which a rotary shaft provided in a first auxiliary apparatus is fitted against relative rotation.

17. The balancer apparatus for an internal combustion engine according to claim 13, wherein a fastening member which is screwed in the gear wheel supporting portion so as to press an end face of the boss portion in a direction in which the gear wheel supporting portion is fitted into the attachment hole has provided thereon an engaging portion with which a rotary shaft provided in a first auxiliary apparatus is fitted against relative rotation.

18. The balancer apparatus for an internal combustion engine according to claim 15, wherein a second auxiliary apparatus is coaxially connected against relative rotation to an end portion of the balancer shaft on the opposite side to the gear wheel supporting portion.

19. The balancer apparatus for an internal combustion engine according to claim 16, wherein a second auxiliary apparatus is coaxially connected against relative rotation to an end portion of the balancer shaft on the opposite side to the gear wheel supporting portion.

20. The balancer apparatus for an internal combustion engine according to claim 17, wherein a second auxiliary apparatus is coaxially connected against relative rotation to an end portion of the balancer shaft on the opposite side to the gear wheel supporting portion.

* * * * *